United States Patent [19]
Nomura

[11] Patent Number: 5,642,340
[45] Date of Patent: Jun. 24, 1997

[54] DEVICE FOR CONTROLLING FOCUS OF AN OPTICAL DISK APPARATUS

[75] Inventor: Masaru Nomura, Tenri, Japan

[73] Assignee: Sharp Kabushiki Kaisha, Osaka, Japan

[21] Appl. No.: 263,891

[22] Filed: Jun. 22, 1994

[30] Foreign Application Priority Data

Jun. 23, 1993 [JP] Japan .................. 5-152424
Jun. 23, 1993 [JP] Japan .................. 5-152447
Dec. 20, 1993 [JP] Japan .................. 5-319895

[51] Int. Cl.⁶ ...................................... G11B 7/09
[52] U.S. Cl. ................... 369/44.25; 369/44.29; 369/44.35
[58] Field of Search .................. 369/44.29, 44.35, 369/44.36, 44.34, 54, 44.25, 44.41; 250/201.5

[56] References Cited

U.S. PATENT DOCUMENTS

| | | | |
|---|---|---|---|
| 4,669,074 | 5/1987 | Hsich et al. | 369/44.35 |
| 4,683,560 | 7/1987 | Takeuchi et al. | 369/44.25 |
| 4,730,294 | 3/1988 | Funada | 369/44.35 X |

FOREIGN PATENT DOCUMENTS 2-61829  3/1990  Japan .
2-220230  9/1990  Japan .

*Primary Examiner*—Thang V. Tran
*Attorney, Agent, or Firm*—David G. Conlin; Milton Oliver

[57] ABSTRACT

A focusing control device for use in an optical disk apparatus of the present invention is provided with: an error-signal generation circuit for generating a focus error signal; a detection circuit for detecting the quantity of light derived from a light beam reflected from an optical disk in order to form a light signal; a voltage-generating circuit for generating an offset signal whose polarity is suitable for an out-focus state based on the difference between a reference signal and the light signal, only when the light signal is smaller than the reference signal, that is, only during the out-focus state; an addition amplifier for adding the offset signal to the focus error signal; and a control circuit for controlling the position of a lens in response to the output of the addition amplifier. With this arrangement, the focus error signal is added by the offset signal so as to be shaped only during the out-focus state. The lens is always driven toward the just-focus position by the use of the focus error signal thus shaped; this eliminates failure in the focus pull-in operation.

27 Claims, 34 Drawing Sheets

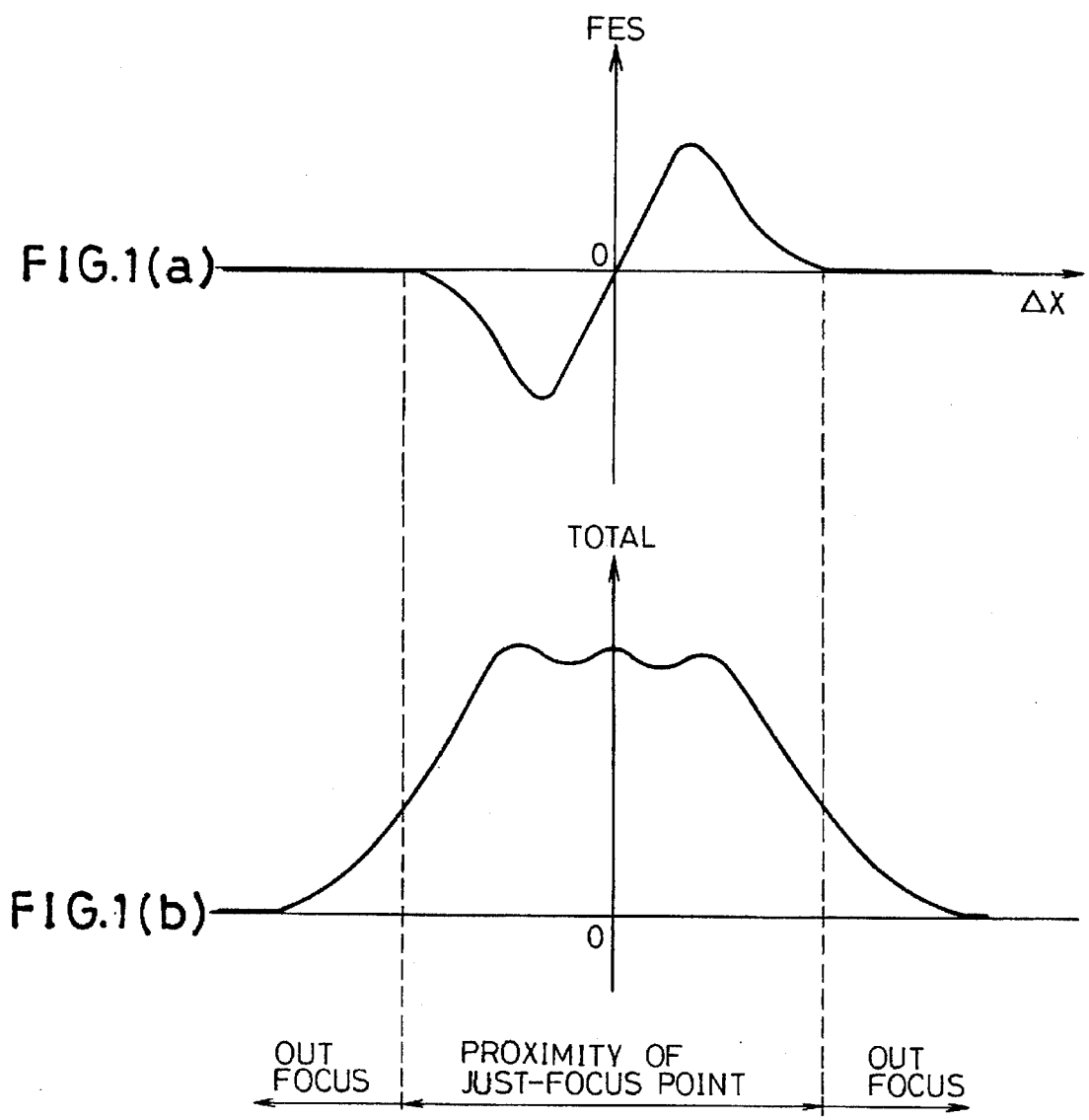

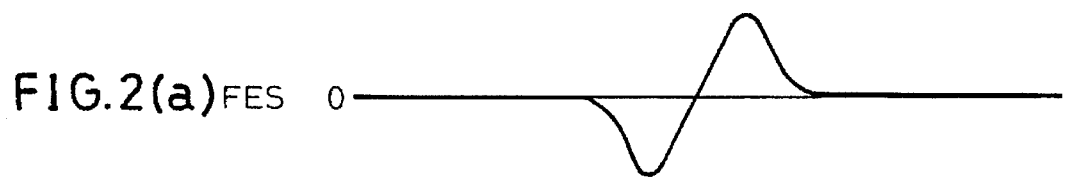
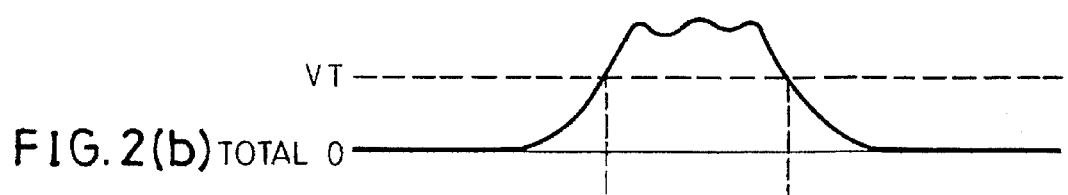
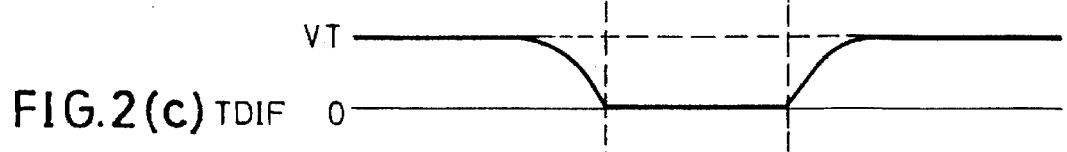
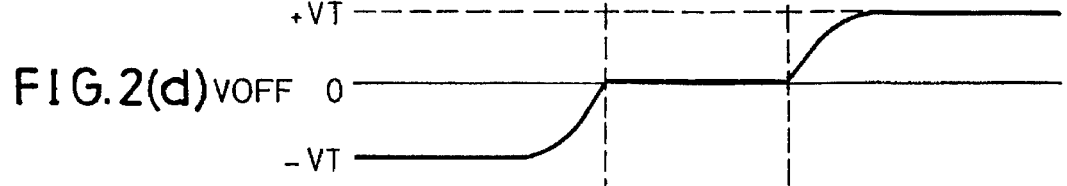
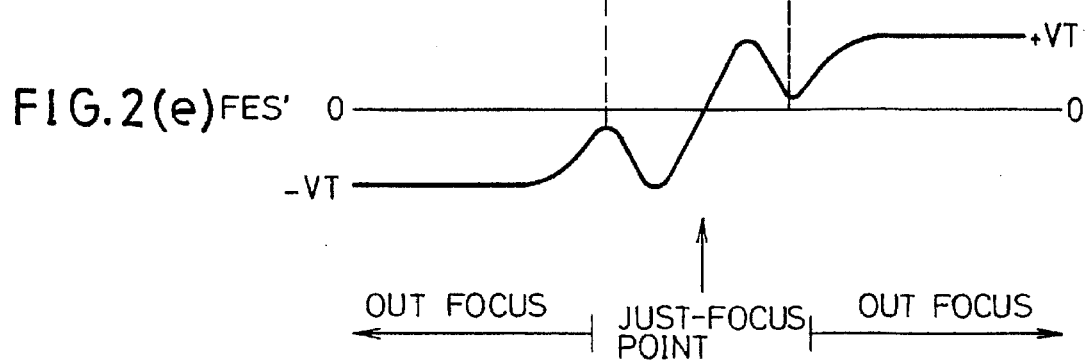

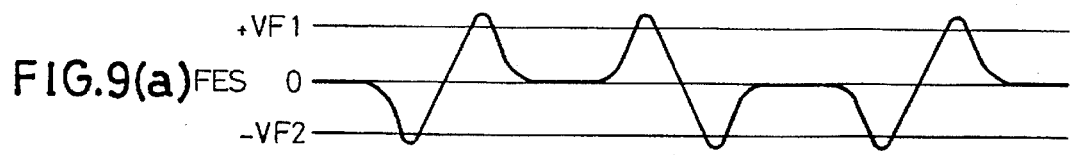
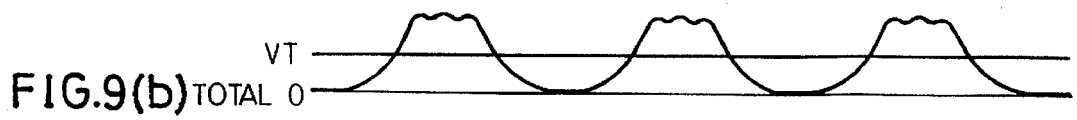
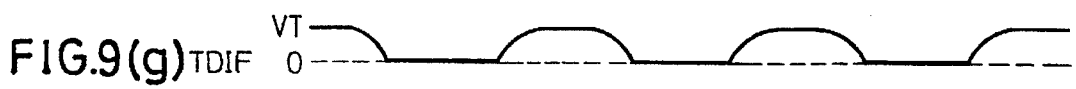
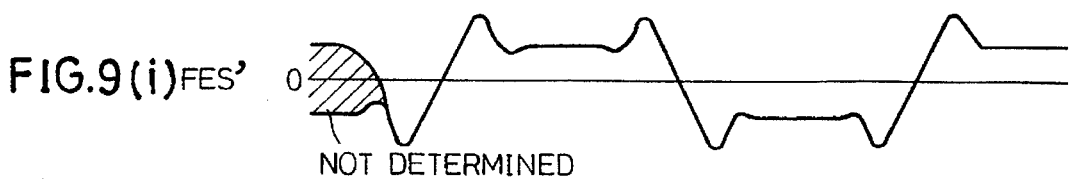
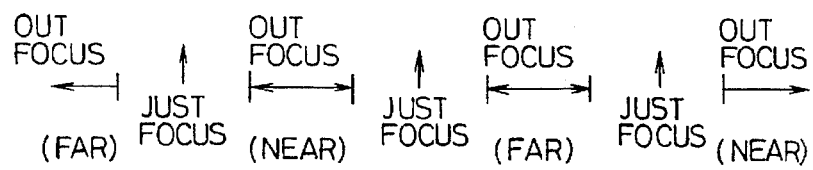

FIG.13
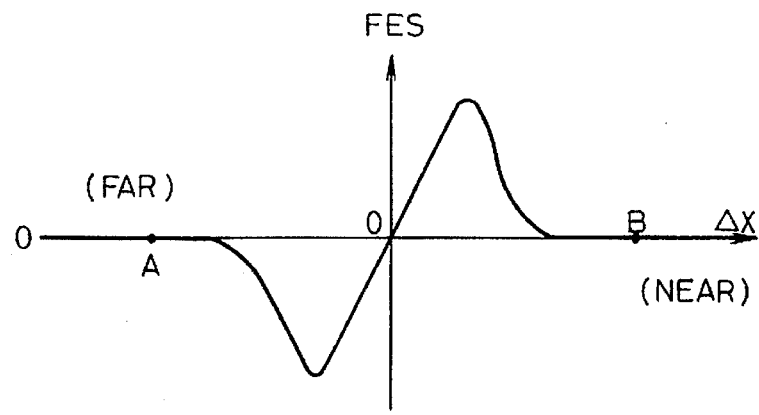
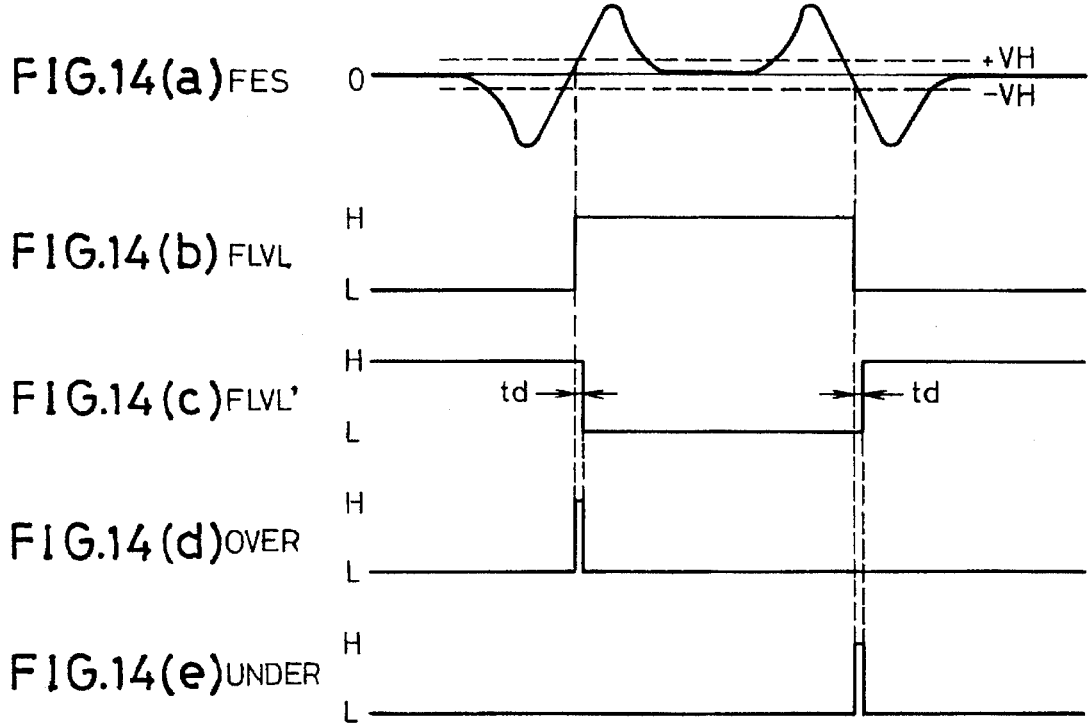

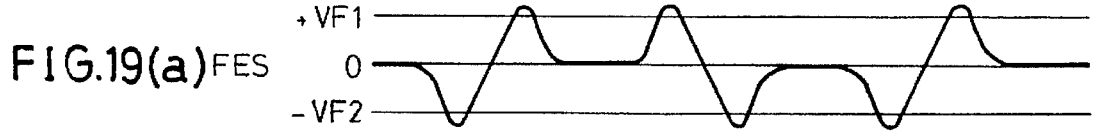
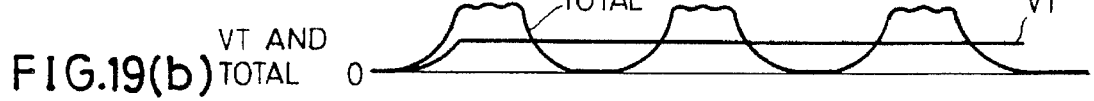
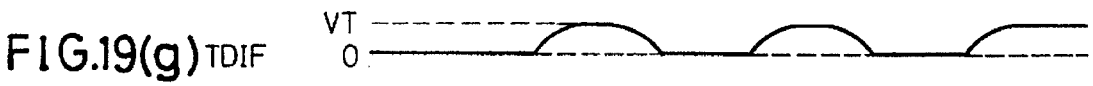
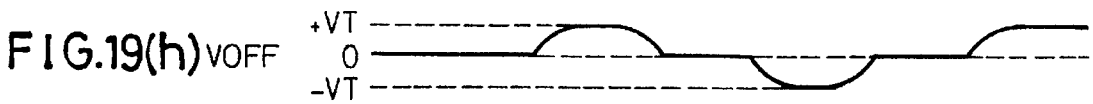
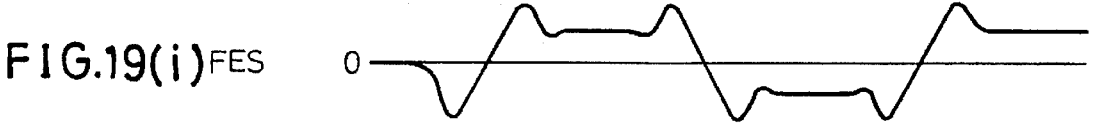
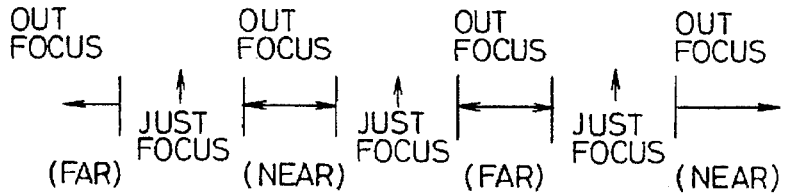

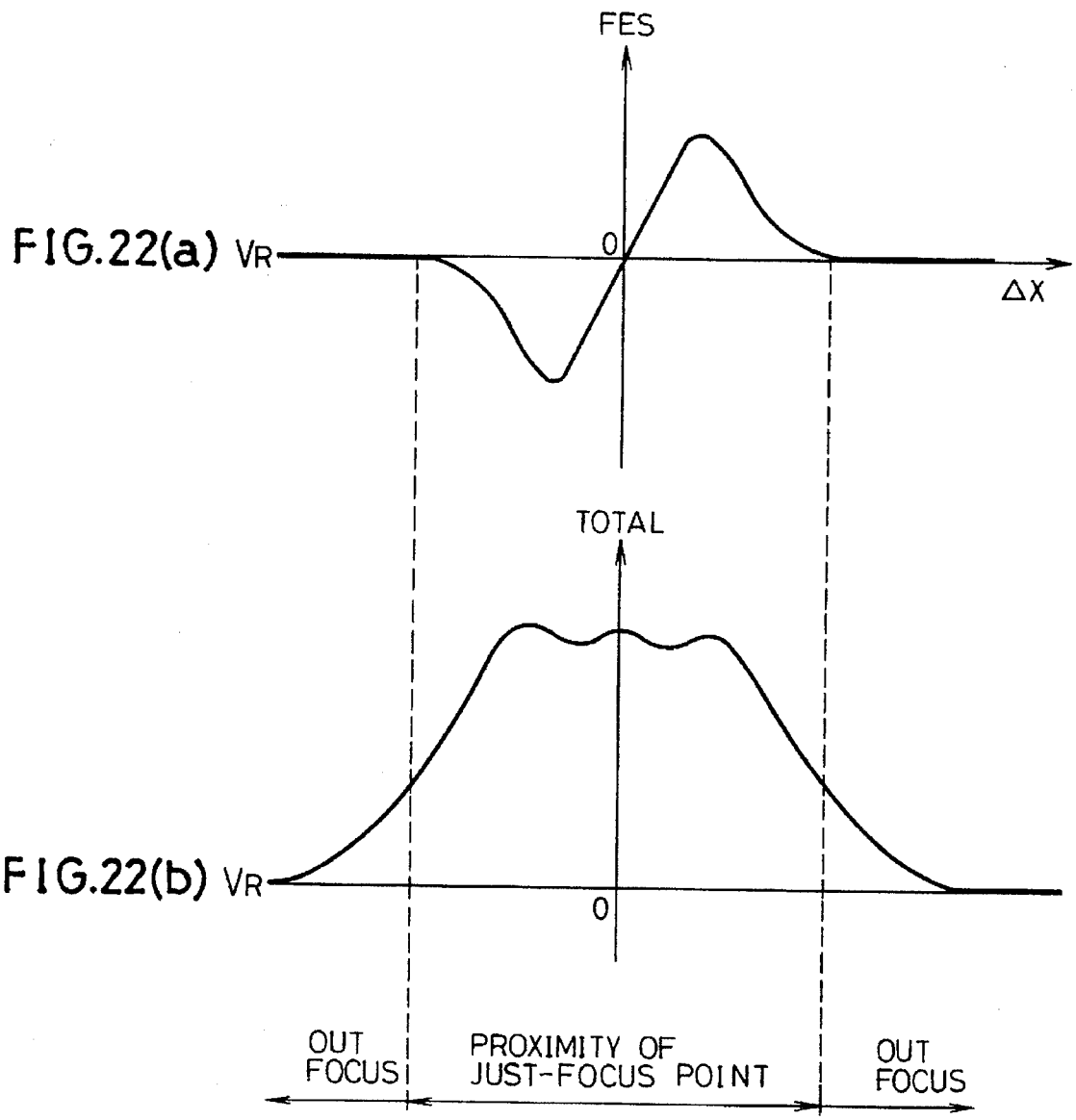

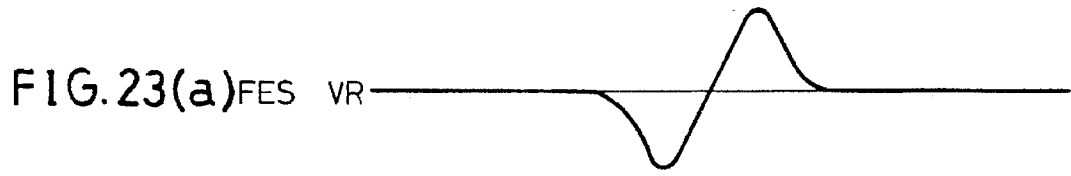
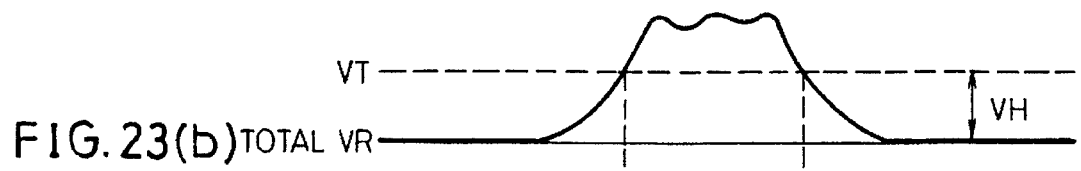
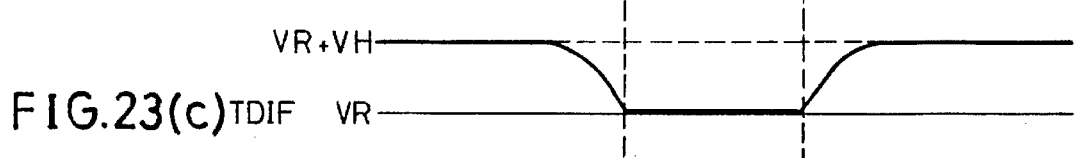
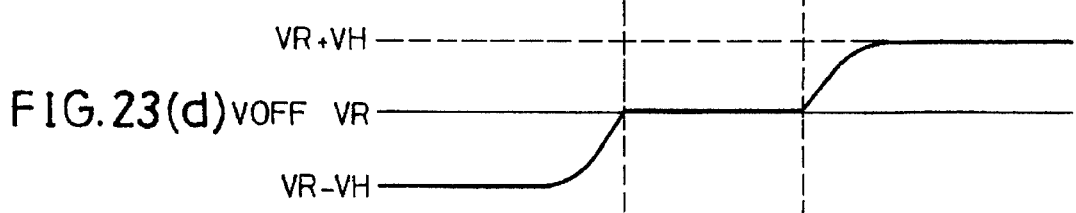
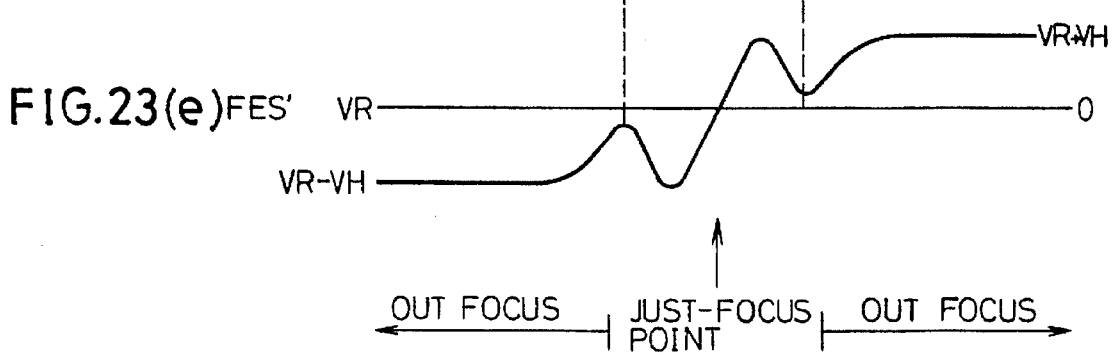

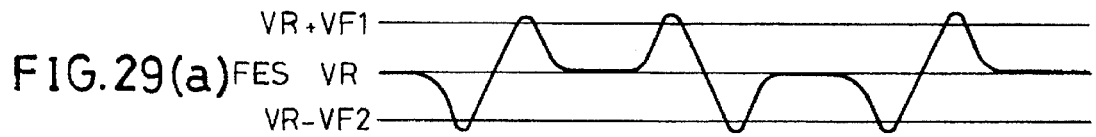
FIG.29(a) FES VR
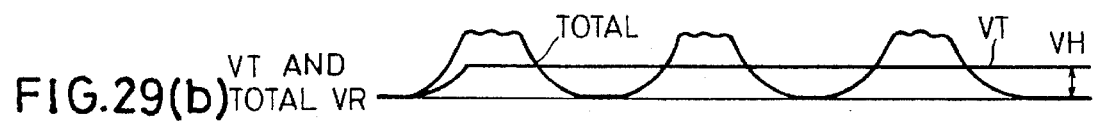
FIG.29(b) VT AND TOTAL VR
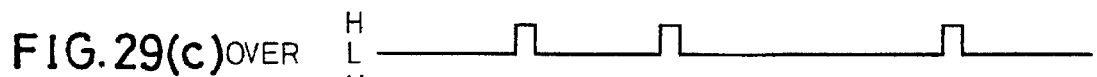
FIG.29(c) OVER
FIG.29(d) UNDER
FIG.29(e) +SEL
FIG.29(f) -SEL
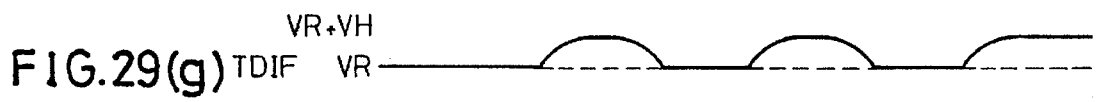
FIG.29(g) TDIF VR
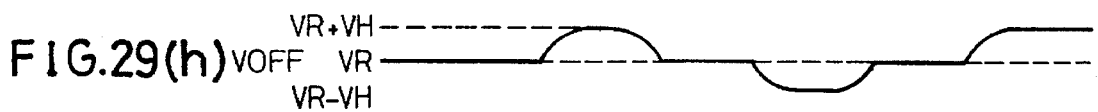
FIG.29(h) VOFF VR
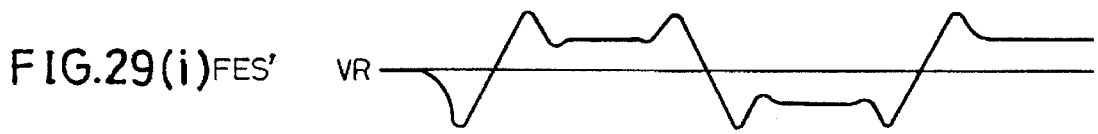
FIG.29(i) FES' VR
OUT FOCUS (FAR) — JUST FOCUS — OUT FOCUS (NEAR) — JUST FOCUS — OUT FOCUS (FAR) — JUST FOCUS — OUT FOCUS (NEAR)

FIG. 40 PRIOR ART
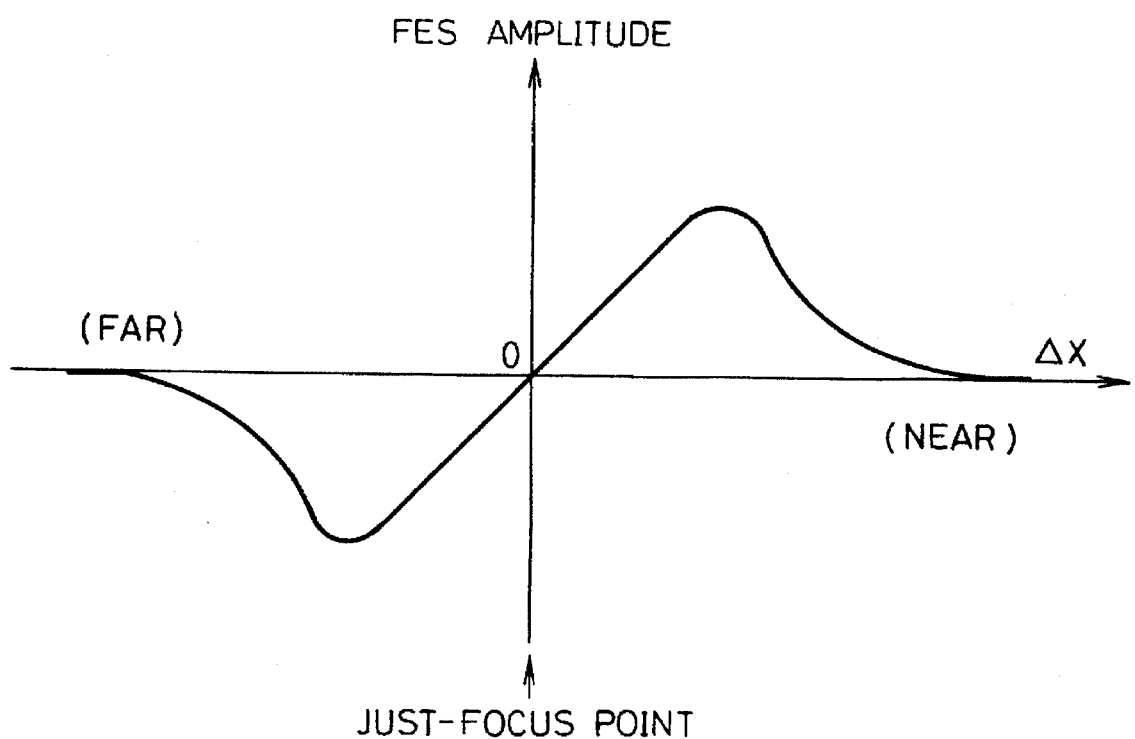
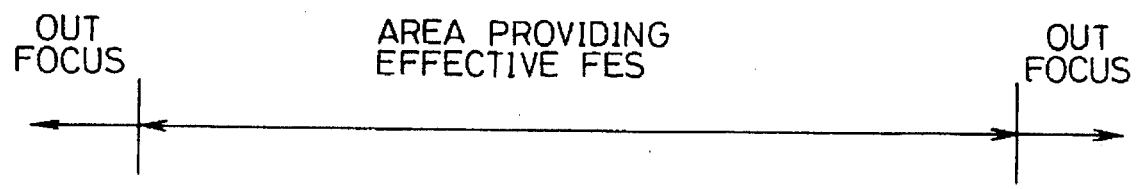

DEVICE FOR CONTROLLING FOCUS OF AN OPTICAL DISK APPARATUS

FIELD OF THE INVENTION

The present invention relates to a construction of a focusing control device for improving the pull-in operation of a focusing servo in an optical disk apparatus.

BACKGROUND OF THE INVENTION

In optical disk apparatuses, it is necessary to always keep a light beam in a preferable state of convergence with respect to the recording face of an optical disk when information is recorded or reproduced. For this reason, a controlling operation called focus (or focusing) servo is carried out.

FIG. 39 shows one example of the focusing control device that is used in a conventional optical disk apparatus. In order to record and reproduce information, an optical pickup 91 converges a light beam 93 onto a recording face 92a of an optical disk 92 through a lens 94. Further, the optical pickup 91 obtains a signal derived from the reflected light from the optical disk 92 by the use of an optical system, not shown, that is installed therein. The signal is sent to an error-signal generation circuit 95. The error-signal generation circuit 95 generates a focus error signal FES, a tracking error signal TES, and other signals from the signal. Here, the focus error signal FES indicates a deviation between a converging position of the light beam 93a and the recording face 92a in the perpendicular direction, and the tracking error signal TES indicates a deviation between a track, not shown, formed on the recording face 92a and the light beam 93 in the radial direction of the optical disk 92.

The focus error signal FES is fed to a focus actuator 99 inside the optical pickup 91 through a phase compensation circuit 96, a switch 97, and a driver 98. Thus, the focus actuator 99 drives the lens 94 in the direction perpendicular to the recording face 92a so as to vary the converging position 93a of the light beam 93. A focus search circuit 90 allows the driver 98 to drive the focus actuator 99 in order to make a focus-searching operation, which will be described later. The controller 101 monitors the focus error signal FES, and conducts management and control of the entire focusing device.

The following description will discuss the relationship between the deviation of the recording face 92a and the converging position 93a, and the focus error signal FES. FIG. 40 is a graph that indicates the deviation Δx between the recording face 92a and the converging position 93a in its horizontal axis as well as indicating the amplitude of the focus error signal FES in its vertical axis.

The origin in FIG. 40 represents a just-focus state in which the converging position 93a coincides with the recording face 92a. The position of the lens 94 corresponding to this just-focus state is hereinafter referred to "just-focus position". The left side of the origin represents a FAR area where the lens 94 is located far from the recording face 92a in relation to the converging position 93a, and the right side of the origin represents a NEAR area where the lens 94 is located near the recording face 92 in relation to the converging position 93a. This drawing shows that the focus error signal FES is a signal which varies in its polarity and amplitude depending on the distance between the recording face 92a and the converging position 93a.

Therefore, in the focusing control device of FIG. 39, if the focus-error generation circuit 95 is designed so as to release the focus error signal FES having the polarity as shown in FIG. 40 and if it is also designed so as to allow the focus actuator 99 to drive the lens 94 in a far direction from the optical disk 92 upon receiving a plus signal in its phase compensation circuit 96, it is possible to provide control so that the converging position 93a is always focused onto the recording face 92a.

However, it is only within a range of several tens of μm in either the near or far direction with respect to the just-focus position that the above-mentioned effective focus error signal FES is obtained. In other words, in an out-focus state beyond this range, the focus error signal FES becomes virtually zero irrespective of the converging position 93a as shown in FIG. 40. For this reason, the positional relationship between the converging position 93a and the recording face 92a becomes rather indefinite, making it difficult to provide effective focusing control. Consequently, in order to provide an effective focusing servo operation, it is necessary to keep the converging position 93a within several tens of μm from the just-focus position.

However, in most cases, when a focusing servo operation is started, the converging position 93a stays out of this range. For this reason, a focus search operation is normally conducted before the focusing servo operation in order to search for a range in which the effective focus error signal FES is obtained.

In FIG. 39, the controller 101 switches the switch 97 on the terminal-E side so that the output of the focus search circuit 90 is supplied to the driver 98. Thus, the driver 98 drives the focus actuator 99 so that the lens 94 is moved in the direction perpendicular to the recording face 92a to a great degree. In this case, if the output of the focus search circuit 90 is given as a wave that varies with time, such as a triangular wave or a sine wave, the lens 94 is moved in the approaching direction or in the departing direction with respect to the recording face 92a; this causes the focus error signal FES to vary as is shown in FIG. 41.

A zero-cross point, which appears in the middle of the course during which the focus error signal FES varies from the plus peak (or the minus peak) to the minus peak (or the plus peak) having the opposite polarity, represents the just-focus state, which has been described in FIG. 40. Therefore, the controller 101 switches the switch 97 onto the terminal-D side so as to start the focusing servo operation at the zero-cross point of the focus error signal FES or in the vicinity thereof. A sequence of processes in which the focus search operation is switched to the focusing servo operation is generally called a focus pull-in operation.

Here, the total of a tolerance due the warp of the optical disk 92 and a mechanical tolerance of the optical pickup 91 or the focus actuator 99 is estimated to be several hundreds of μm. For this reason, the signal to be released by the focus search circuit 90 is formed so as to have an amplitude that is large enough to allow the focus actuator 99 (and the lens 94) to move at least not less than this total tolerance. Thus, it becomes possible to always obtain an effective focus error signal FES during the focus search operation.

In order to shorten the time required for the focus pull-in operation, the following two methods are employed. One method is to increase the frequency of the output signal from the focus search circuit 90 in order to increase the frequency of passages per unit time of the focus error signal FES with respect to the zero-cross point, that is, a target for the focus pull-in operation.

However, this method raises the following problems.

As described earlier, the range in which the focus pull-in operation is available is restricted to several tens of μm before and after the just-focus position. Therefore, in comparison with the movement having a range of several hundreds μm during the focus search operation, the above-mentioned range is very small, only reaching several percent to 10 or 20 percent of the range. For this reason, when movable parts such as the lens 94 receive great momentums from the focus actuator 99 during the focus search operation, it is impossible to stop the movement of the lens 94 within the range of several tens of μm before and after the just-focus position, even if the controller 101 switches the switch 97 onto the terminal-E side at to the zero-cross point of the focus error signal FES. As a result, the lens 94 tends over shoot and to move up to an out-focus position. Therefore, the positional relation between the converging position 93a and the recording face 92a becomes indefinite, resulting in a failure in the focus pull-in operation.

The higher the frequency and amplitude of the signal released by the focus search circuit 90 become, the higher the possibility of failure in the focus pull-in operation. Moreover, a phenomenon wherein the recording face 92a of the optical disk 92 runs out in the perpendicular direction due to the rotation of the optical disk 92, that is, so-called facial vibration, tends to increase the relative velocity between the recording face 92a and the lens 94; this further increases the possibility of failure in the focus pull-in operation.

For example, in Japanese Laid-Open Patent Publication No. 220230/1990 (Tokukaihei 2-220230), there is an example of such techniques that are adopted to improve the focus pull-in operation in order to solve the above-mentioned problem. In this technique, consideration is given to the way of changes in a signal (sum signal) indicating the quantity of reflected light from the optical disk 92 and the focus error signal FES that are obtained in the vicinity of the just-focus position at which the effective focus error signal FES is obtained. More specifically, in the case where the levels of ac components of the focus error signal FES and the sum signal exceed predetermined values, that is, in the case where the focus actuator 99 is about to move the lens 94 apart from the just-focus position, a signal having a polarity to allow the focus actuator 99 (and the lens 94) to approach the just-focus position is supplied to the focus servo system instead of the focus error signal FES. With this arrangement, the focus error signal FES is shaped so that the range enabling the focus pull-in operation can be expanded.

In the technique disclosed in this patent publication, in order to make a decision as to whether the lens 94 is located in the proximity of the just-focus position or at an out-focus position, circuits for extracting ac components of a plurality of signals used for generating the sum signal and the focus error signal FES and circuits for adjusting the phases of the ac components are combined together and utilized. Further, in order to expand the range enabling the focus pull-in operation, the focus error signal FES is shaped while adjusting the levels and timings of these signals in a very sensitive manner.

However, the problem of the arrangement of the above-mentioned patent publication is that a complicated circuit configuration is necessary because many circuits including comparators, high-pass filters, low-pass filters sample-hold circuits, etc. are employed.

Further, when the optical disk 92 is replaced, the level of the sum signal in the proximity of the just-focus position, the level of the focus error signal FES, and the degree and velocity of the facial vibration also change; this raises another problem that desirable performance is not obtained without readjusting the time constants of the high-pass filter and low-pass filter as well as readjusting the reference level of the comparator.

SUMMARY OF THE INVENTION

The object of the present invention is to provide a focusing control device used for an optical disk apparatus, which is capable of improving the accuracy of the focus pull-in operation by the use of a simple circuit configuration.

In order to achieve the above object, the focusing control device used for an optical disk apparatus of the present invention is provided with the following means:

(1) error-signal generation means for generating a focus error signal (for example, error-signal generation circuit).

(2) detection means for detecting the quantity of light derived from a light beam reflected from an optical disk or transmitted through the optical disk (for example, photodetector).

(3) voltage-generating means for generating an offset signal for moving a lens toward a just-focus position which allows the light beam to be focused onto the optical disk only when the quantity of light is smaller than a predetermined value (for example, error-direction detection circuit, storage circuit, light-difference detection circuit, and polarity-switching circuit).

(4) addition means for adding the offset signal to the focus error signal (for example, addition amplifier).

(5) control means for controlling the position of the lens in response to the output of the addition means (for example, driver, focus actuator).

With the above arrangement, the quantity of light derived from the reflected light beam or the transmitted light beam becomes smaller than the predetermined value in the out-focus state, and only in this state, the voltage-generating means generates the offset signal for shaping the focus-error signal. Therefore, the output of the addition means becomes equal to the focus error signal in the proximity of the just-focus position, and is represented by the addition of the focus error signal and the offset signal in the out-focus position. As a result, even if the focus error signal becomes almost zero in the out-focus position, the lens is always driven toward the just-focus position in accordance with the offset signal; this eliminates failure in the focus pull-in operation.

In addition to the above-mentioned arrangement (1) through (5), a light-reference-value generation means for setting the predetermined value based on the maximum value of the quantity of light is installed. This arrangement eliminates the necessity of having to adjust the predetermined value in response to the variation of the maximum value of the quantity of light depending on the optical disk, as well as preventing adverse effects on the focus servo operation due to an inaccurate offset signal that is caused by the variation of the predetermined value; therefore, it is possible to obtain a more stable focus servo operation.

In order to achieve the aforementioned object, another focusing control device used for an optical disk apparatus of the present invention is provided with at least the following means in addition to the above-mentioned arrangement (1), (2) and (4).

(6) discrimination means for discriminating whether the lens is located at an out-focus position that is closer to the optical disk in relation to the just-focus position or the lens is located at an out-focus position that is farther from the optical disk in relation to the just-focus position, in accordance with the focus error signal (for example, error-direction detection circuit);

(7) light-difference signal generation means for generating a light-difference signal that has an amplitude corresponding to the difference between a predetermined value and the quantity of light only when the quantity of light is smaller than the predetermined value (for example, light-difference detection circuit).

(8) polarity-inverting means for generating an offset signal that is made by inverting the polarity of the light-difference signal in accordance with the out-focus position (for example, polarity-switching circuit).

(9) addition means for adding the offset signal to the focus error signal.

(10) control means for moving the lens to an initial out-focus position prior to the focus pull-in operation; for releasing a polarity-decision signal to the polarity-inverting means so as to allow an offset signal to be released with a polarity corresponding to the initial out-focus position; and for controlling the position of the lens in response to the output of the addition means (for example, controller, driver, focus actuator).

In the above arrangement, if the control means did not release the polarity-decision signal to the polarity-inverting means, the polarity of the offset signal would be undetermined until the discrimination means releases the result of the discrimination. Therefore, when the control means has preliminarily moved the lens to the initial out-focus position, the polarity of the offset signal has not been determined. However, the control means releases the polarity-decision signal to the polarity-inverting means so that the offset signal has the polarity corresponding to the initial out-focus position; this makes it possible to drive the lens from the initial out-focus position toward the just-focus position. As a result, this arrangement simplifies the control operation for the focus pull-in operation as well as shortening the time required for the focus pull-in operation.

In order to achieve the aforementioned object, still another focusing control device used for an optical disk apparatus of the present invention is provided with at least the following means.

(1) a pickup for recording and reproducing information by projecting a light beam onto an optical disk.

(2) focus-error detection means for detecting a focus error between an information detecting point of the pickup and the recording face of the optical disk (for example, error-signal generation circuit).

(3) light detection means for detecting the quantity of light derived from the light beam reflected from the optical disk or transmitted through the optical disk (for example, photodetector).

(4) light-reference-value generation means for generating a light reference value from the output of the light detection means (for example, light-reference-value generation circuit).

(5) light-difference detection means for releasing the difference between the output of the light detection means and the light reference value when the output of the light detection means is not more than the light reference value (for example, light-difference detection circuit).

(6) error-direction detection means for detecting a direction of an error that occurs between the information detecting point of the pickup and the recording face of the optical disk (for example, error-direction detection circuit).

(7) polarity-switching means for releasing the output of the light-difference detection means after switching the polarity thereof in response to the output of the error-direction detection means (for example, polarity-switching circuit).

(8) addition means for adding the output of the polarity-switching means to the output of the focus-error detection means (for example, addition amplifier).

(9) servo means for adjusting the information detecting point of the pickup in accordance with the output of the addition means (for example, driver, focus actuator).

With the above arrangement, the signal to be added to the focus error signal in the out-focus state is switched in its polarity depending on the out-focus position in question; therefore, the pickup is always driven toward the just-focus position in accordance with the output of the addition means.

In other words, the above arrangement makes it possible to shape the focus error signal so that an effective focus pull-in operation is always available. Thus, the time required for the focus pull-in operation is shortened, and the accuracy and reliability of the focus pull-in operation are improved. Further, in the proximity of the just-focus position where the output of the light detection means exceeds the light reference value, the output of the polarity-switching means is not added to the output of the focus-error detection means; therefore, no adverse effects are given on the focus servo operation. Moreover, the light reference value is generated in accordance with the output of the light detection means; therefore, it is possible to clearly determine the border as to whether or not the output of the polarity-switching means is to be added to the output of the focus-error detection means independently of the index of reflection of the optical disk. This arrangement provides a more stable focus servo operation.

Additionally, the reference voltage of the focus error signal is not necessarily set to 0 V; it may be any voltage between 0 V and the power supply voltage to be supplied to the optical disk apparatus.

In order to achieve the aforementioned object, still another focusing control device used for an optical disk apparatus of the present invention is provided with at least the following means.

(1) error-signal generation means for generating a focus error signal (for example, error-signal generation circuit).

(2) discrimination means for releasing a first result of discrimination indicating that the lens is closer to the optical disk in relation to the just-focus position, or a second result of discrimination indicating that the lens is farther from the optical disk in relation to the just-focus position (for example, error-direction detection circuit).

(3) voltage-generating means for generating an offset signal whose polarity becomes positive upon receiving one of the outputs of the first result and second result of discrimination, and becomes negative upon receiving the other output (for example, storage circuit and selection circuit).

(4) addition means for adding the offset signal to the focus error signal (for example, addition amplifier).

(5) control means for releasing to the voltage-generating means an inhibit signal for inhibiting the offset signal from being generated in a proximity area including the just-focus position, as well as for controlling the position of the lens in response to the output of the addition means (for example, controller, driver, focus actuator).

Since the polarity of the offset signal for shaping the focus error signal is either positive or negative, the offset signal does not become zero even at the just-focus position, and is kept being released. Here, in the above arrangement, by releasing the inhibit signal to the voltage-generating means, the control means inhibits the offset signal from being generated in the proximity of the just-focus position. Thus, the offset signal becomes zero at the just-focus position, thereby giving no adverse effects on the focus servo operation. Since the output of the addition means is converged within a limited range, the proximity of the just-focus position is readily recognized by the control means.

For a fuller understanding of the nature and advantages of the invention, reference should be made to the ensuing detailed description taken in conjunction with the accompanying drawings.

BRIEF DESCRIPTION OF THE DRAWINGS

FIGS. 1(a) and 1(b) are graphs of wave forms indicating the relationship between a focus error signal and a reflected light signal in a focusing control device of the present invention.

FIGS. 2 (a) through 2 (e) are graphs of wave forms that explain a principle whereby the wave form of the focus error signal is shaped in the focusing control device of the present invention.

FIGS. 9(a) through 9(i) are graphs of wave forms that show a sequence of operations whereby the focusing control device of FIG. 3 shapes the wave form of the focus error signal.

FIG. 13 is a graph of a wave from indicating a focus error signal.

FIGS. 14(a) through 14(e) are graphs that indicate a sequence of operations of the error-direction detection circuit of FIG. 12.

FIGS. 19(a) through 19(i) are graphs of wave forms that show a sequence of operations whereby the focusing control device of FIG. 17 shapes the wave form of the focus error signal.

FIGS. 22(a) and 22(b) are graphs of wave forms indicating the relationship between a focus error signal and a reflected light signal in a focusing control device that is operated by a single power source.

FIGS. 23(a) through 23(e) are graphs of wave forms that show a sequence of operations whereby the focusing control device, which is operated by a single power source, shapes the wave form of the focus error signal.

FIGS. 29(a) through 29(i) are graphs of wave forms that show a sequence of operations whereby the focusing control device, which is operated by a single power source, shapes the wave form of the focus error signal.

FIG. 40 is a graph of a wave form indicating a focus error signal in the focusing control device of FIG. 39.

DESCRIPTION OF THE EMBODIMENTS

Figure 3:
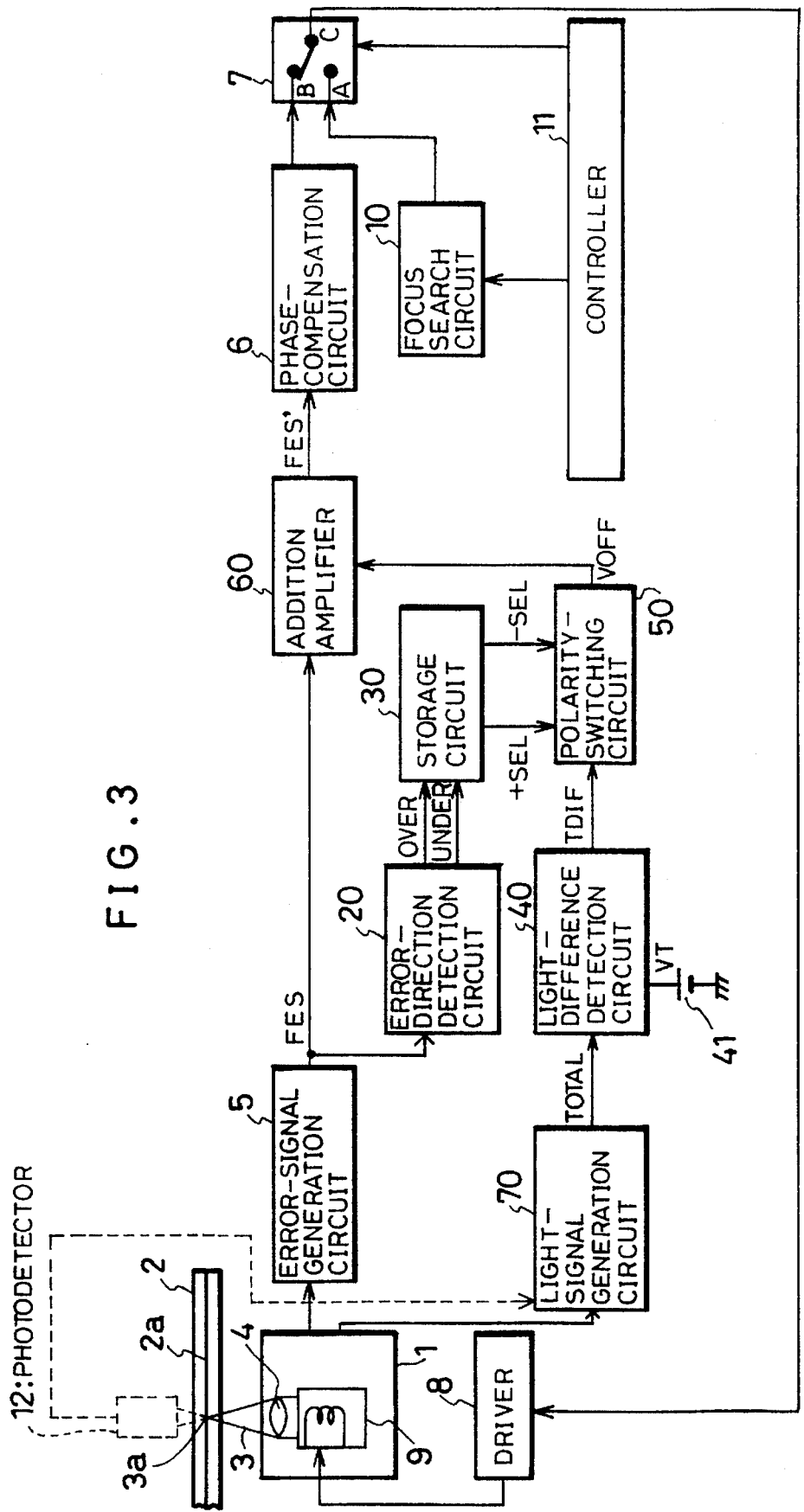
FIG. 3 is a block diagram showing one structural example of the focusing control device of the present invention.

In the present invention, consideration is given to how a reflected light signal TOTAL changes in a course from the proximity of the just-focus position at which an effective focus error signal FES is obtained to the out-focus position.

FIGS. 1(a) and 1(b) show a general example of the relationship between the focus error signal FES and the reflected light signal TOTAL. Generally, the intensity of the reflected light signal TOTAL is great within a range in the proximity of the just-focus position at which an effective focus error signal FES is obtained. However, slight variations exist in the intensity of the reflected light signal TOTAL because of the influences of the tracks on the recording face of an optical disk and the optical system installed inside an optical pickup. In this range, the focus error signal FES, which is a signal for accurately indicating the degree and direction of a deviation of the lens from the just-focus position, allows the servo means such as a driver and a focus actuator to be properly driven toward the just-focus position. In contrast, at the out-focus position, since the focus error signal FES becomes virtually zero, it can no longer indicate even the direction of a deviation of the lens from the just-focus position, as described earlier.

Here, when consideration is given to the reflected light signal TOTAL, it is noted that as the deviation increases from the proximity of the just-focus position to the out-focus position, the reflected light signal TOTAL gradually decreases in the same manner as the focus error signal FES approaches zero. Therefore, as shown in FIG. 2(b), at the time when the reflective light signal TOTAL goes lower than a reference value VT, if the difference from the reference value VT is found by using an electric circuit, and released it as a signal TDIF (see FIG. 2(c)), the signal TDIF will be used for driving the focus actuator toward the just-focus position. Here, when the intensity of the reflected light signal TOTAL is not less than the reference value VT, the signal TDIF is kept at zero.

It is of course necessary to switch the polarity of the signal TDIF depending on the direction of the out-focus. Here, in the course from the proximity of the zero-cross point to the out-focus position, if the polarity of the focus error signal FES at its peak is detected and stored; and if how the polarity of the focus error signal FES changes to form the zero-cross point is detected and stored, it is possible to switch the polarity of the signal TDIF easily. By switching the polarity of the signal TDIF is this manner, an offset signal VOFF (see FIG. 2(d)) is obtained. When this is added to the focus error signal FES (FIG. 2(a)), a signal FES' (see FIG. 2(e)) is obtained and its polarity is used for driving the focus actuator toward the just-focus position all the time even in an out-focus state.

In contrast, at the time when the level of the reflected light signal TOTAL is not less than the reference value VT, that is, in the proximity of the just-focus position, since the focus error signal FES is obtained in a clear form, there is no need of adding the offset signal VOFF to the focus error signal FES. On the contrary, addition of the offset signal VOFF may affect as disturbance by which the focus servo operation is executed at a position that deviates from the just-focus position. Therefore, if a circuit configuration is made so that only when the reflected light signal TOTAL goes lower than the reference value VT, the difference therefrom is released as the signal TDIF, the offset signal VOFF functions as a signal for driving the focus actuator toward the just-focus position in the out-focus state, and becomes zero so as not to intervene with the focus servo operation in the proximity of the just-focus position. This arrangement makes it possible to solve the above problems all at once.

The present invention is based on the above-mentioned principle and the consideration.

[FIRST EMBODIMENT]

Referring to FIGS. 3 through 7 as well as FIGS. 8(a) through 8(i), the following description will discuss one embodiment of the present invention. FIG. 3 shows one structural example of a focusing control device of the present invention.

In FIG. 3, the focus error signal FES is supplied from an error signal generation circuit 5 to an error-direction detection circuit 20 (discrimination means and error-direction detection means). The error-direction detection circuit 20 releases a signal OVER to a storage circuit 30 (discrimination means and error-direction detection means) when the focus error signal FES goes higher than a plus reference voltage +VF1, and releases a signal UNDER to the storage circuit 30 when the focus error signal FES goes lower than a minus reference voltage −VF2.

The storage circuit 30 releases a signal +SEL which is derived from the signal OVER, and releases a signal −SEL which is derived from the signal UNDER. Here, it is of course not possible to release the signal OVER and the signal UNDER at the same time. This is because the focus error signal FES does not have the plus and minus voltages at the same time, and because it is impossible for the focus error signal FES to go higher than +VF1 and to go lower than −VF2 at the same time. Therefore, these signals +SEL and −SEL are never released at the same time.

A quantity of light, which is returned to an optical pickup 1 after having been reflected by an optical disk 2, is supplied to a light signal generation circuit 70 (voltage-generating source) as a photoelectric current through an optical system and a photodetector, not shown, installed inside the optical pickup 1, and is then given to a light-difference detection circuit 40 (voltage-generating source) as a reflected light signal TOTAL. Additionally, a photodetector 12, which detects the quantity of light that has passed through the optical disk 2, may be installed, and the output thereof may be connected to the light signal generation circuit 70.

The light-difference detection circuit 40 compares the reflected light signal TOTAL with a reference value VT of light signal that is given by a voltage source 41. As a result, when the reflected light signal TOTAL is not more than the reference value VT, the light-difference detection circuit 40 releases the difference therefrom (the reference value VT−the reflected light signal TOTAL) as a signal TDIF. When the reflected light signal TOTAL exceeds the reference value VT, it releases 0 (V) as the signal TDIF. Here, the signal TDIF is assumed not to become minus as explained earlier.

A polarity-switching circuit 50 (polarity-switching means) releases the signal TDIF, as it is, as the offset signal VOFF while the signal +SEL is being released from the storage circuit 30. In contrast, the polarity-switching circuit 50 inverts the polarity of the signal TDIF, and releases the resulting signal as the offset signal VOFF while the signal −SEL is being released from the storage circuit 30. Here, it is assumed that no offset signal VOFF having either polarity is released while neither the signal +SEL nor the signal −SEL is released; yet, in an actual operation, the offset signal VOFF of either polarity may be released, as will be clarified later in an operational explanation.

The offset signal VOFF is sent from the polarity-switching circuit 50 to an addition amplifier 60 (adder), where it is added to the focus error signal FES. The output signal FES' of the addition amplifier 60 passes through the terminal B and the common terminal C of a switch 7 after passing through a phase-compensation circuit 6, and is supplied to a driver 8. The driver 8 drives a focus actuator 9, and moves a lens 4 to vary the converging position 3a of a light beam 3. A focus search circuit 10 is connected to the terminal A of the switch 7.

Here, in the same manner as described in FIG. 40 that was used in the explanation of the prior art, the focus error signal FES becomes minus when the lens 4 is located far from the recording face 2a in relation to the just-focus position, and becomes plus when it is located near the recording face 2a. Further, the focus actuator 9 is driven in such a direction as to take the lens 4 further from the recording face 2a when the focus error signal FES is plus, and driven in such a direction as to take the lens 4 closer to the recording face 2a when the focus error signal FES is minus.

The following description will discuss the error-direction detection circuit 20, the storage circuit 30, the light-difference detection circuit 40, the polarity switching circuit 50, and the addition amplifier 60 more specifically.

Figure 4:
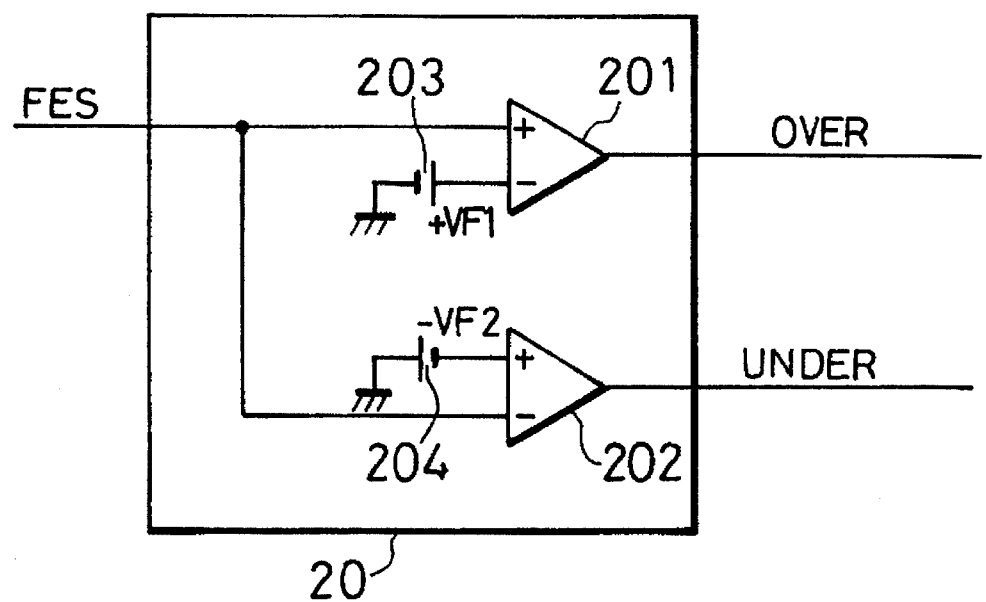
FIG. 4 is a circuit diagram showing an error-direction detection circuit in the focusing control device of FIG. 3.

As illustrated in FIG. 4, the error-direction detection circuit 20 is constituted of comparators 201 and 202 and voltage sources 203 and 204 which respectively generate plus and minus reference voltages +VF1 and −VF2. The focus error signal FES is commonly supplied to the non-inverting input of the comparator 201 and the inverting input of the comparator 202. Further, the reference voltages +VF1 and −VF2 released from the voltage sources 203 and 204 are respectively inputted to the other input terminals of the comparators 201 and 202. With this arrangement, when the focus error signal FES becomes greater than the reference voltage +VF1, the signal OVER is released from the comparator 201, and when the focus error signal FES becomes smaller than the reference voltage −VF2, the signal UNDER is released from the comparator 202.

Figure 5:
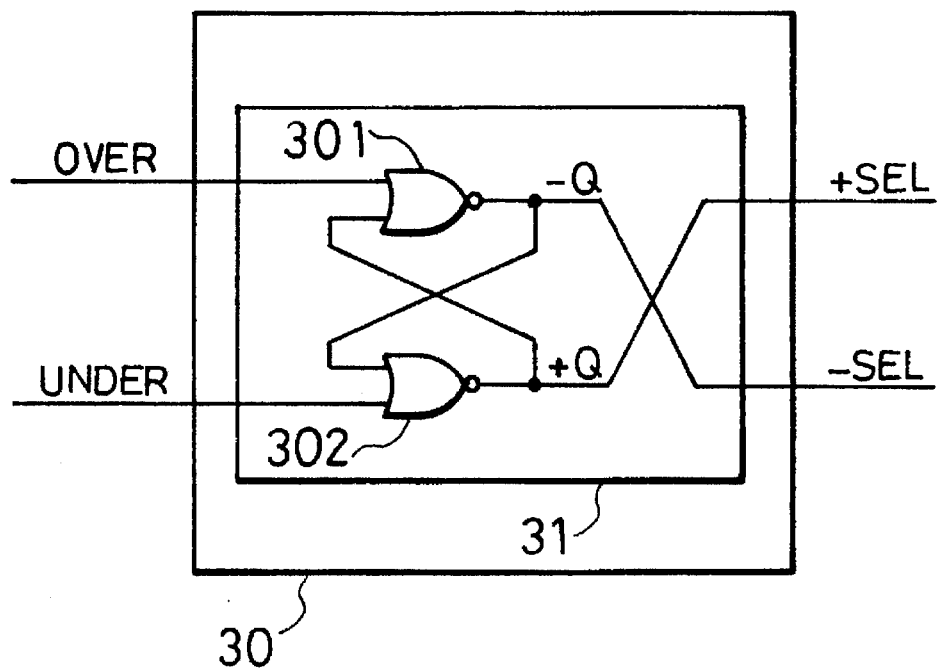
FIG. 5 is a circuit diagram showing a storage circuit in the focusing control device of FIG. 3.

FIG. 5 shows a structural example of the storage circuit 30. The storage circuit 30 is constituted by a RS flipflop 31 consisting of NOR gates 301 and 302.

When the signal OVER having the logic "H" level is inputted to one of the input terminals of the NOR gate 301, the output +Q of the RS flipflop 31 turns to the "H" level, while the output −Q turns to the "L" level. In contrast, when the signal UNDER is inputted to one of the input terminals of the NOR gate 302, the output +Q of the RS flipflop 31 turns to the "L" level, while the output −Q turns to the "H" level. The RS flipflop 31 hold its state until the respective outputs of the NOR gate 301 and 302 are fed to each other through the other's input terminal. These outputs +Q and −Q are respectively released as the signals +SEL and −SEL.

Figure 6:
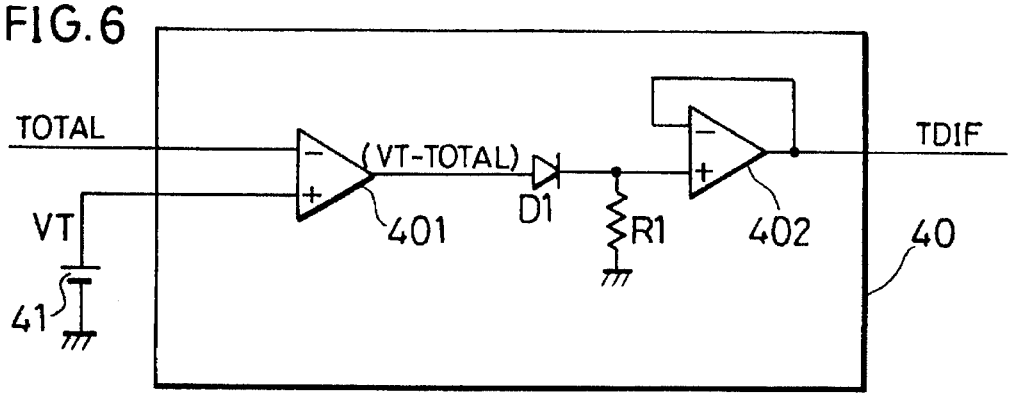
FIG. 6 is a circuit diagram showing a light-difference detection circuit in the focusing control device of FIG. 3.

As illustrated in FIG. 6, the light-difference detection circuit 40 is constituted of a differential amplifier 401, a diode D1, a resistor R1, and a buffer amplifier 402.

The differential amplifier 401 finds a voltage value generated by the voltage source 41, that is, the difference between the reflected light signal TOTAL and the reference value VT of light signal (the reference value VT−the reflected light signal TOTAL), and releases the resulting signal. Here, since the diode D1 is connected to the output of the differential amplifier 401, a voltage corresponding to the difference develops across the resistor R1 only when (the reference value VT−the reflective light signal TOTAL) >0 holds, and no voltage develops when (the reference value VT− the reflective light signal TOTAL) ≦0 holds, thereby indicating zero. The voltage across the resistor R1 is released as the signal TDIF through the buffer amplifier 402.

Additionally, when (the reference value VT− the reflective light signal TOTAL) >0 holds, the signal TDIF includes an error due to the forward-direction voltage drop (approximately 0.7 V) of the diode D1. In order to avoid this error, such a method as setting the reference value VT higher enough to compensate for the voltage drop can be taken.

Figure 7A:
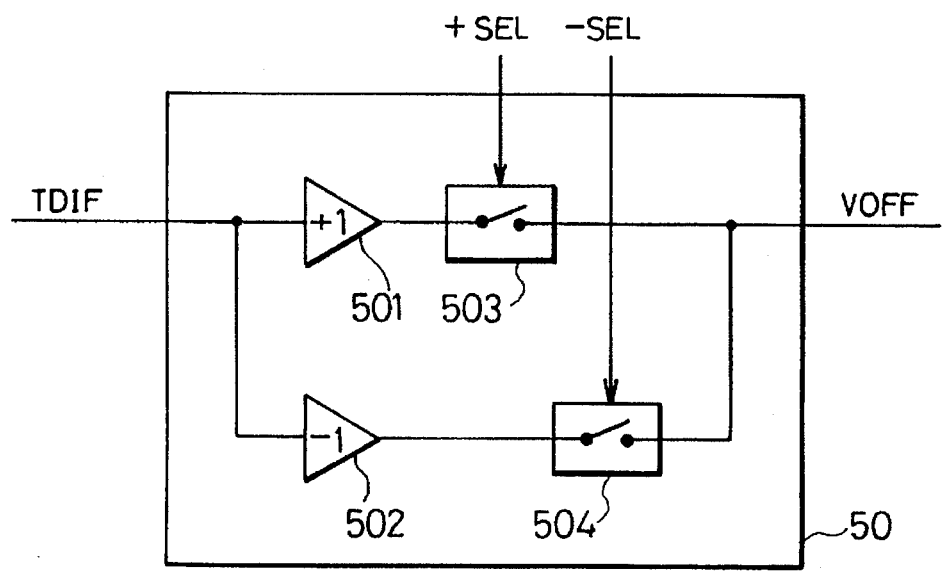
FIGS. 7(a) and 7(b) are circuit diagrams that respectively show polarity-switching circuits in the focusing control device of FIG. 3.

The following description will discuss a construction of the polarity-switching circuit 50. As illustrated in FIG. 7(a), the polarity-switching circuit 50 is constituted of a non-inverting amplifier 501, an inverting amplifier 502, switches 503 and 504. When the signal +SEL having the logic "H" level is inputted, the switch 503 turns on, thereby allowing the signal TDIF to be released as the offset signal VOFF. When the signal −SEL having the logic "L" level is inputted, the switch 504 turns on, and the signal TDIF has its polarity inverted, and is released as offset signal VOFF. When neither the signal +SEL nor the signal −SEL is inputted, that is, when both of the inputs show the logic "L" level, both of the switches 503 and 504 turn off, and the offset signal VOFF is not released.

Figure 7B:
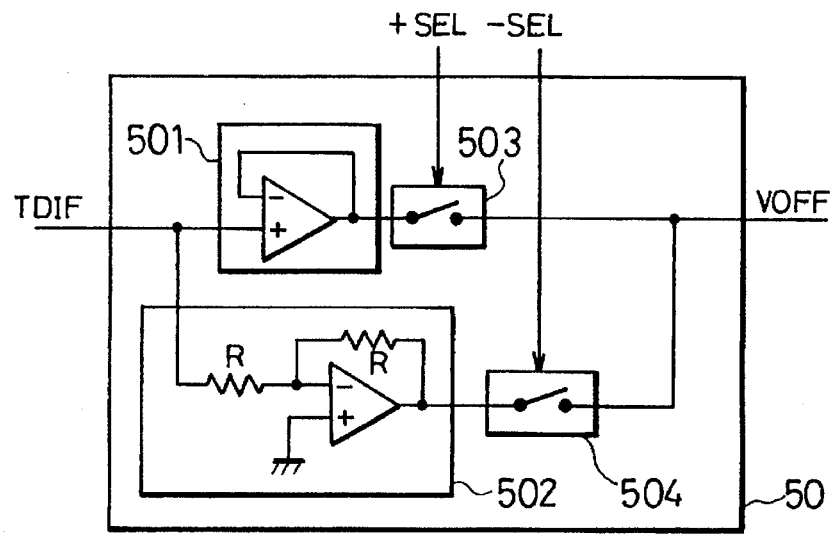

FIG. 7(b) shows an example of construction wherein the non-inverting amplifier 501 and the inverting amplifier 502 are mainly constituted of OP amplifiers.

Figure 8:
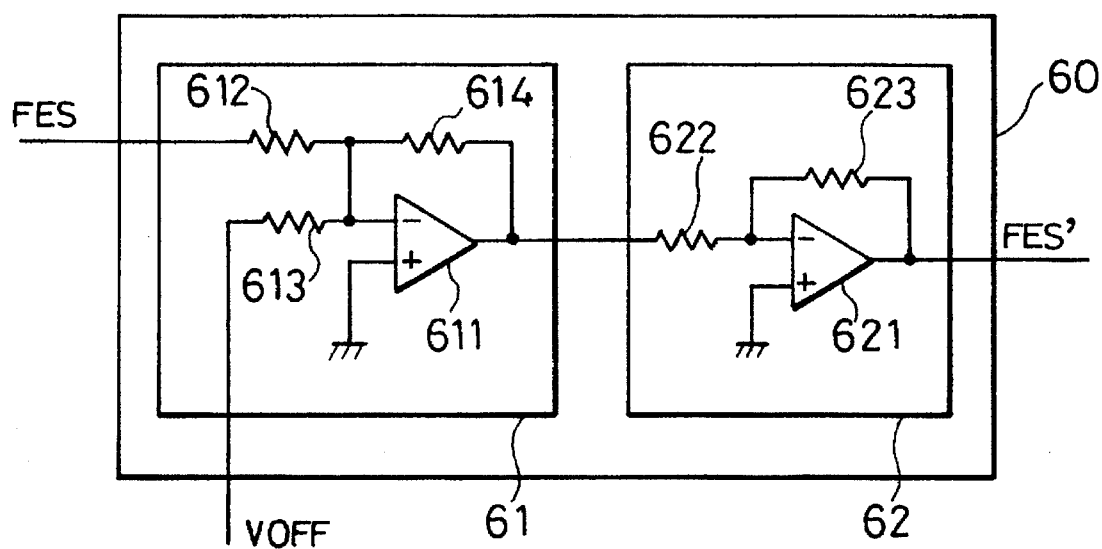
FIG. 8 is a circuit diagram showing an addition amplifier in the focusing control device of FIG. 3.

As illustrated in FIG. 8, the addition amplifier 60 is constituted of an inverting addition amplifier 61 consisting of an OP amplifier 611 and resistors 612, 613, and 614, and an inverting amplifier 62 consisting of an OP amplifier 621 and resistors 622 and 623. The inverting addition amplifier 61 adds the focus error signal FES and the offset signal VOFF released from the polarity-switching circuit 50 so that each of their polarities is inverted. The inverting amplifier 62 inverts the polarity of the input of the inverting addition amplifier 60 again. Consequently, the addition amplifier 60 adds the focus error signal FES and the offset signal VOFF with their polarities remaining as they original states, thereby releasing a signal FES' as a result.

In the above-mentioned construction, the following description will discuss the focus pull-in operation of the focusing control device of the present invention, referring to FIGS. 3 and FIGS. 9(a) through 9(i). When a focus search operation is conducted prior to the focus pull-in operation, a controller 11 switches the switch 7 to the terminal A side, supplies the signal from the focus search circuit 10 to the driver 8, and allows the driver 8 to drive the focus actuator 9 (and the lens 4).

During the driving process of the focus actuator 9 (and the lens 4), every time the focus actuator 9 reaches the proximity of the just-focus position at which the converging position 3a of a light beam 3 coincides with the recording face 2a of the optical disk 2, a focus error signal FES, as shown in FIG. 9(a), is obtained. At this time, it is different depending on two cases wherein the lens 4 is approaching the optical disk 2 from a further position and it is departing from the optical disk 2 to a further position whether a plus peak first appears or a minus peak first appears with respect to the focus error signal FES. In FIG. 9(a) since the minus peak first appears, this case shows that the focus search operation is started from a further position toward the just-focus position.

Moreover, as shown in FIG. 9(b), the reflected light signal TOTAL reaches a high level in the proximity of the just-focus position.

When the focus error signal FES is greater than the reference voltage +VF1 in its plus side, a signal OVER shown in FIG. 9(c) is released from the error-direction detection circuit 20. In contrast, when the focus error signal FES is greater than the reference voltage −VF2 in its minus side, a signal UNDER shown in FIG. 9(d) is released from the error-direction detection circuit 20. As shown in FIG. 9(e), the output signal +SEL of the storage circuit 30 is set by the signal OVER, and reset by the signal UNDER. As shown in FIG. 9(f), the output signal −SEL of the storage circuit 30 is reset by the signal OVER, and set by the signal UNDER.

Here, it is indefinite which output signal, +SEL or −SEL of the storage circuit 30, is in the logic "H" level at the start of the operation. These factors are all determined when the signal OVER (or UNDER) is first inputted to the storage circuit 30 during the focus search operation; the same is true in the offset signal VOFF and the signal FES' both of which will be described later.

As shown in FIG. 9(g), the light-difference detection circuit 40 releases the difference between the level of the reflected light signal TOTAL and the reference value VT as the signal TDIF only when the reflected light signal TOTAL goes lower than the reference value VT.

The polarity-switching circuit 50 remains the polarity of the signal TDIF as it is while the signal +SEL having the logic "H" level is being released, and inverts the polarity of the signal TDIF while the signal −SEL having the logic "L" level is being released, thereby releasing the offset signal VOFF as shown in FIG. 9(h). The offset signal VOFF, which becomes zero in the proximity of the just-focus position irrespective of the states of the signals +SEL and −SEL, as described earlier, does not affect either the focus pull-in operation or the focus servo operation in the proximity of the just-focus position. In contrast, in the out-focus state, it becomes a signal having a polarity that corresponds to a further or nearer position.

Therefore, the signal FES', which is a signal obtained by adding the offset signal VOFF to the original focus error signal FES (see FIG. 9(a)) through the addition amplifier 60, is identical to the original focus error signal FES in the proximity of the just-focus position, but becomes virtually identical to the offset signal VOFF in the out-focus state, as shown in FIG. 9(i). In this manner, the actuator 9 is always driven toward the just-focus position as its target by the signal FES'.

As a result, upon conducting the focus servo operation with the switch 7 switched to the terminal B side, even if the optical pickup 1 should run out of the proximity of the just-focus position and come into an out-focus state, the lens 4 (and the converging position 3a) is immediately brought back to the proximity of the just-focus position; consequently, no failure occurs in the focus pull-in operation.

[SECOND EMBODIMENT]

Figure 10:
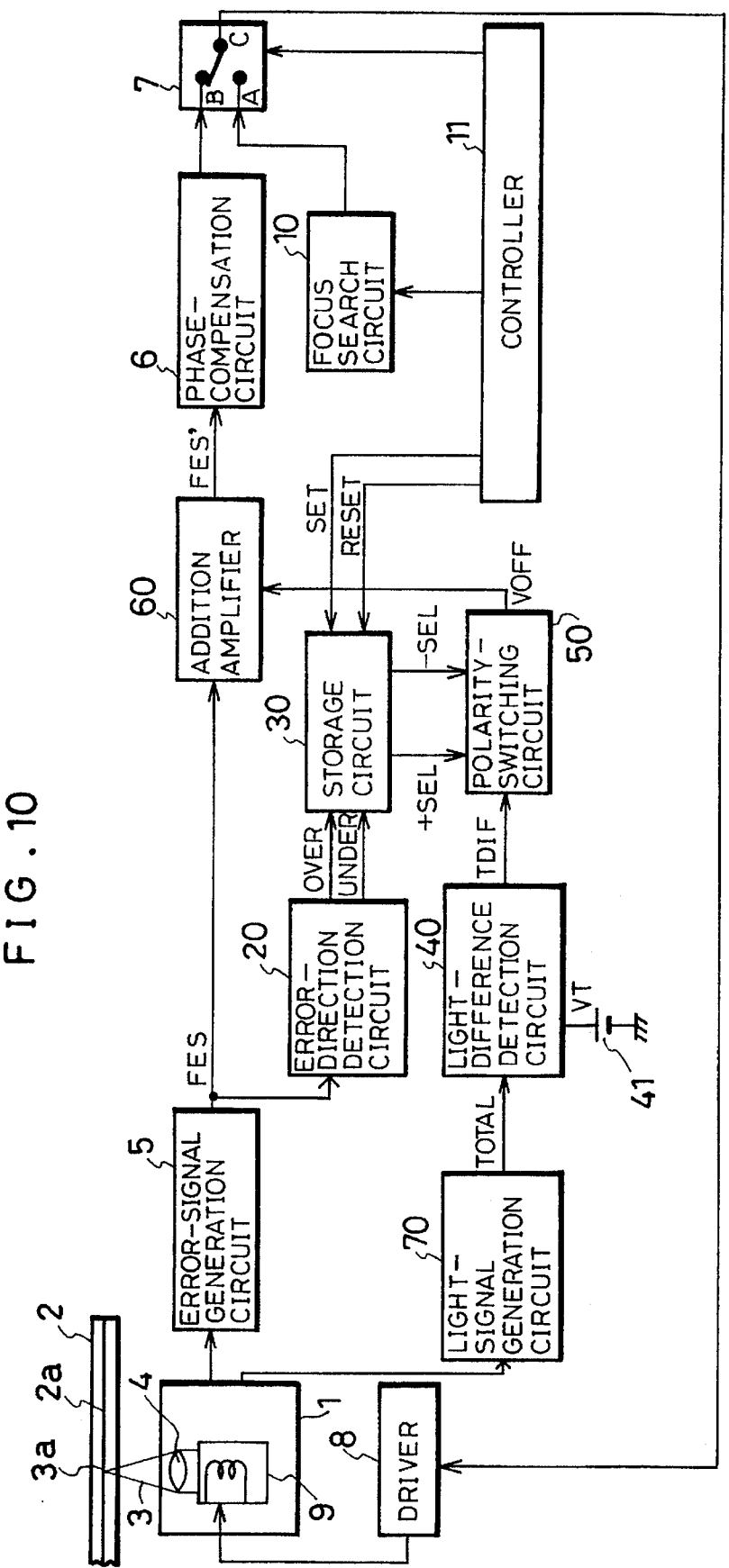
FIG. 10 is a block diagram showing another structural example of the focusing control device of the present invention.
Figure 11:
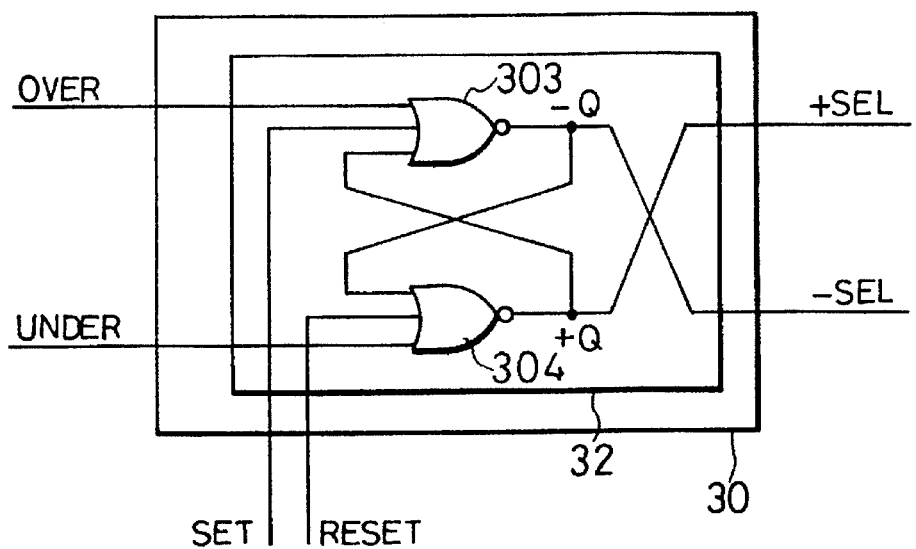
FIG. 11 is a circuit diagram showing a storage circuit in the focusing control device of FIG. 10.

Referring to FIGS. 10 and 11, the following description will discuss the second embodiment of the present invention. Here, for convenience of explanation, those members that have the same functions and that are described in the aforementioned embodiment with reference to its drawings are indicated by the same reference numerals and the description thereof is omitted.

In the focusing control device of the present embodiment, the storage circuit 30 is different from that of the first embodiment. As illustrated in FIG. 11, the storage circuit 30 is constituted by an RS flipflop 32 consisting of NOR gates 303 and 304 provided with three inputs. The variations of the output signals +SEL and −SEL that are caused by the signals OVER and UNDER are the same as those of the first embodiment.

However, as illustrated in FIGS. 10 and 11, in the present embodiment, signals SET and RESET are respectively inputted to one of the three inputs of the NOR gates 303 and 304 from the controller 11.

In the storage circuit 30 of the first embodiment, it is indefinite which signal, +SEL or −SEL, has the logic "H" level at the start of the operation as shown in FIGS. 9(e) and 9(f); therefore, neither the logic of the offset signal VOFF nor the logic of the signal FES' is indefinite at the start of the operation. The logics of these signals are determined when the signal OVER (or UNDER) is first inputted. From this time on, the offset signal VOFF to be added to the focus error signal FES has a proper polarity that is always capable of bringing the lens 4 (and the converging position 3a) from an out-focus position back to the proximity of the just-focus position.

Here, in accordance with the storage circuit 30 of the present embodiment, the controller 11 is arranged to release the signal SET (or RESET) having the logic "H" level prior to a focus search operation even for an instant; therefore, it is possible to preliminarily determine the levels of the signals +SEL and −SEL as well as the polarity of the offset signal VOFF to be added to the focus error signal FES.

Consequently, since the storage circuit 30 is provided with the inputs of the signals SET and RESET, the focus pull-in operation of the focusing control device is simplified in comparison with that of the first embodiment.

For example, suppose that the controller 11 switches the switch 7 to the terminal A side, drives the focus actuator 9 by controlling the focus search circuit 10, and preliminarily brings the lens 4 to a position substantially further from the optical disk 2 (an out-focus position in the FAR area). At this time, if the controller 11 sends the signal RESET for an instant to the storage circuit 30 so as to allow the storage circuit 30 to enter the initial state ready for releasing the signal −SEL, the minus offset signal VOFF is released from the polarity-switching circuit 50. As a result, the focus error signal FES, which is zero in response to the out-focus position, is added by the minus offset signal VOFF, thereby generating the signal FES' having the minus polarity from the very beginning. Therefore, the focus actuator 9 is able to move the lens 4 properly toward the just-focus position without having a period in which its operation becomes indefinite.

Since the positioning of the lens 4 is automatically made at the proximity of the just-focus position by merely switching the switch 7 to the terminal B side, the controller 11 completes the focus pull-in operation without the necessity of any other specific processes. Thus, the control operation of the focus pull-in is simplified, and the focus pull-in operation is readily completed. Further, as has been repeatedly described, since the offset signal VOFF automatically becomes zero in the proximity of the just-focus position, the offset signal VOFF does not give any adverse effects on the focus servo operation in the proximity of the just-focus position.

In the first embodiment, in order to determine the polarity of the offset signal VOFF, the focus search circuit 10 needs to drive the focus actuator 9 toward the proximity of the just-focus position at least one time; therefore, it is necessary to provide a voltage source for generating a signal that varies with time, such as a triangular wave or a sine wave. However, in the present embodiment, as clearly described in the sequence of the focus pull-in operation, it is only necessary for the focus search circuit 10 to provide a dc voltage source that is large enough to drive the focus actuator 9 so that the lens 4 is moved sufficiently further from the optical disk 2.

[THIRD EMBODIMENT]

Figure 12:
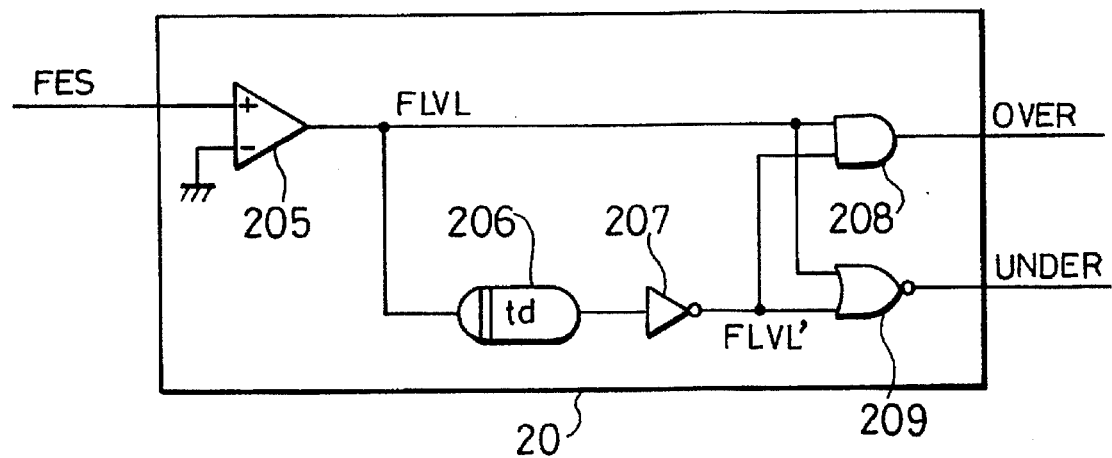
FIG. 12 is a circuit diagram showing another error-direction detection circuit that is used in the focusing control device of the present invention.

Referring to FIGS. 12 through 14, the following description will discuss the third embodiment of the present invention. Here, for convenience of explanation, those members that have the same functions and that are described in the aforementioned embodiment with reference to its drawings are indicated by the same reference numerals and the description thereof is omitted.

In the focusing control device of the present embodiment, the error-direction detection circuit 20 is different from that of the first embodiment. As illustrated in FIG. 12, the error-direction detection circuit 20 is consisted of hysteresis comparator 205, a delay line (delay device) 206, a NOT gate 207, an AND gate 208, and a NOR gate 209, and the signal OVER is released from the AND gate 208 and the signal UNDER is released from the NOR gate 209.

In the first and second embodiments, in order to recognize the directional characteristic of an out-focus state, that is, whether the converging position 3a of the optical beam 3 is too far from the recording face 2a of the optical disk 2 or too close thereto (on the NEAR area or on the FAR area), a judgement is made as to the polarity of the focus error signal FES by comparing the focus error signal FES with the reference voltage +VF1 or −VF2 in the course from the proximity of the just-focus position to the out-focus position.

However, it is also possible to make the judgement on the directional characteristic of an out-focus state by using the zero-cross of the focus-error signal FES. For example, in the focus error signal as shown in FIG. 13, suppose that the converging position 3a is located on point A in the FAR area in its initial state. Then, supposing that the converging position 3a has moved from point A in the FAR area to point B in the NEAR area, the polarity of the focus error signal FES changes from minus to plus through zero (this change is referred to as the zero-cross from minus to plus). In contrast, supposing that the converging position 3a has moved from point B in the NEAR area to point A in the FAR area, the polarity of the focus error signal FES changes from plus to minus through zero (this change is referred to as the zero-cross from plus to minus).

By utilizing the above-mentioned fact, the error-direction detection circuit 20 of the present embodiment judges that the optical pickup 1 is moving toward the out-focus state in the NEAR area upon detection of the zero-cross from minus to plus of the focus error signal FES, and releases the signal OVER. In contrast, upon detection of the zero-cross from plus to minus of the focus error signal FES, the error-direction detection circuit 20 of the present embodiment judges that the optical pickup 1 is moving toward the out-focus state in the FAR area, and releases the signal UNDER.

The following description will discuss the above-mentioned operation. When the focus error signal FES, shown in FIG. 14(a), is inputted to the error-direction detection circuit 20, the output signal FLVL of the hysteresis comparator 205 comes to have the logic "H" level or the logic "L" level depending on whether the polarity of the focus error signal FES has changed from plus to minus or from minus to plus, as shown in FIG. 14(b). A signal FLVL' is obtained by delaying the signal FLVL by a period of time td by the use of the delay line 206 and inverting it by the use of the NOT gate 207 (see FIG. 14(c)). The signal OVER is obtained by finding a logical product of the signals FLVL and FLVL' in the AND gate 208 (see FIG. 14(d)). The signal UNDER is obtained by finding an inversion of logical sum of the signals FLVL and FLVL' in the NOR gate 209 (see FIG. 14(e)).

When the signals OVER and UNDER are compared with the focus error signal FES, it is noted that the signal OVER indicates the time at which the polarity of the focus error signal FES changed from minus to plus and the signal UNDER indicates the time at which the polarity of the focus error signal FES changed from plus to minus. Here, by the use of the hysteresis voltage ±VH of the hysteresis comparator 205 (see FIG. 14(a)), it is possible to indicate the point of time at which the polarity of the focus error signal FES has changed from minus to plus as well as the point of time at which it has changed from plus to minus, and to eliminate the possibility of faulty operation during the out-focus state, that is, during the state where the focus error signal FES ≃0 holds.

In the error-direction detection circuit 20 of the second embodiment, the logic of the signal OVER (or the signal UNDER) is not determined until the focus error signal FES has exceeded the reference voltage +VF1 (or −VF2), and after the determination has been made, the logics of the output signals +SEL and −SEL of the storage circuit 30 and the polarity of the offset signal VOFF are determined.

In contrast, the error-direction detection circuit 20 of the present embodiment, the zero-cross of the focus error signal FES determines the logic of the signal OVER (or the signal UNDER), thereby making it possible to determine the logics of the output signals +SEL and −SEL of the storage circuit 30 and the polarity of the offset signal VOFF.

In any case, as disclosed in the second embodiment, depending on whether the focus pull-in operation is started from the FAR area side or from the NEAR area side, the controller 11 releases the signal SET or the signal RESET. Once the initial state of the storage circuit 30 is determined through the above-mentioned process, it is possible to determine the logics and polarities of these signals, OVER, UNDER, +SEL, −SEL and VOFF, from the very beginning of the focus pull-in operation.

As a result, the focusing control device of the present embodiment carries out the focus pull-in operation in the same manner as the second embodiment.

[FOURTH EMBODIMENT]

Figure 15:
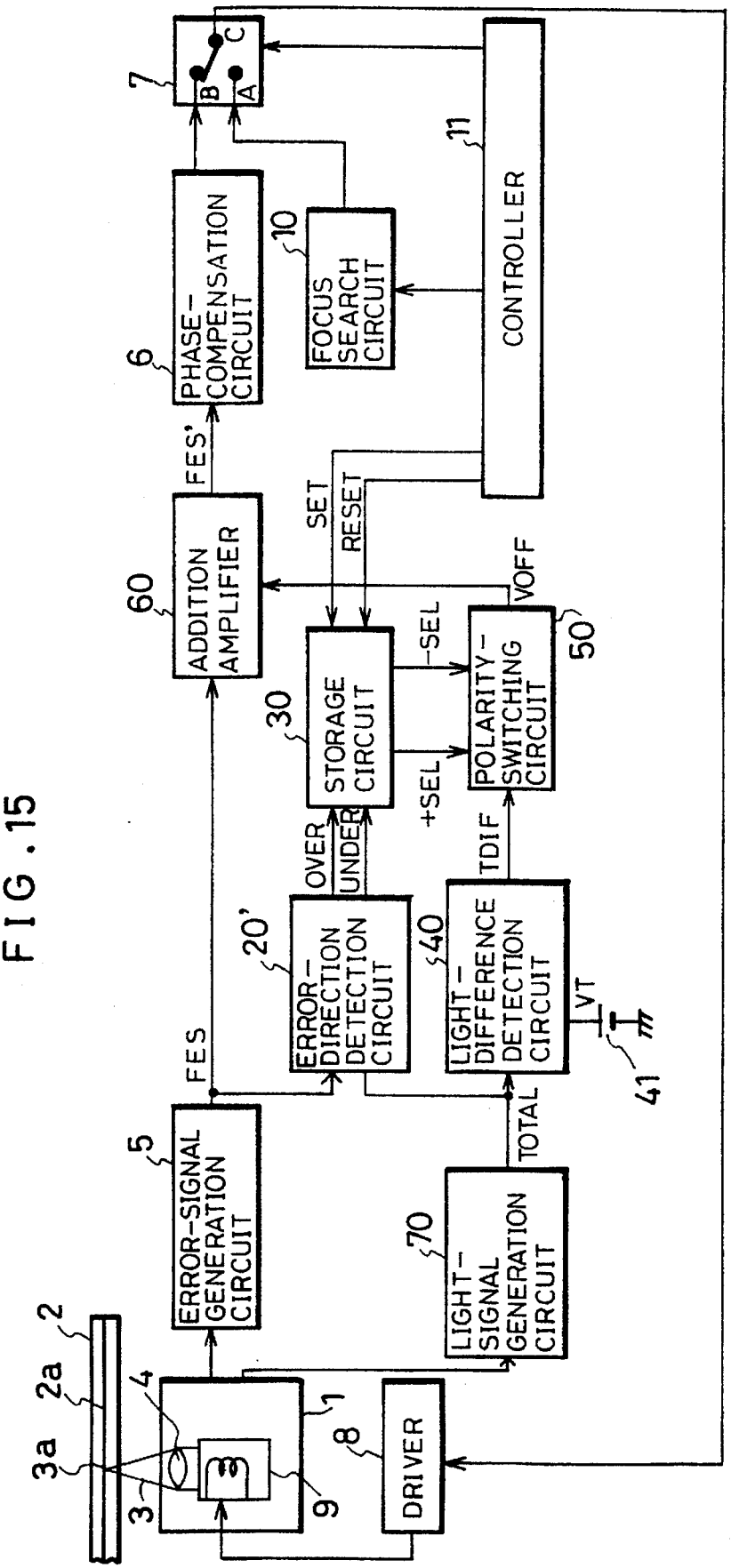
FIG. 15 is a block diagram showing still another structural example of the focusing control device of the present invention.
Figure 16:
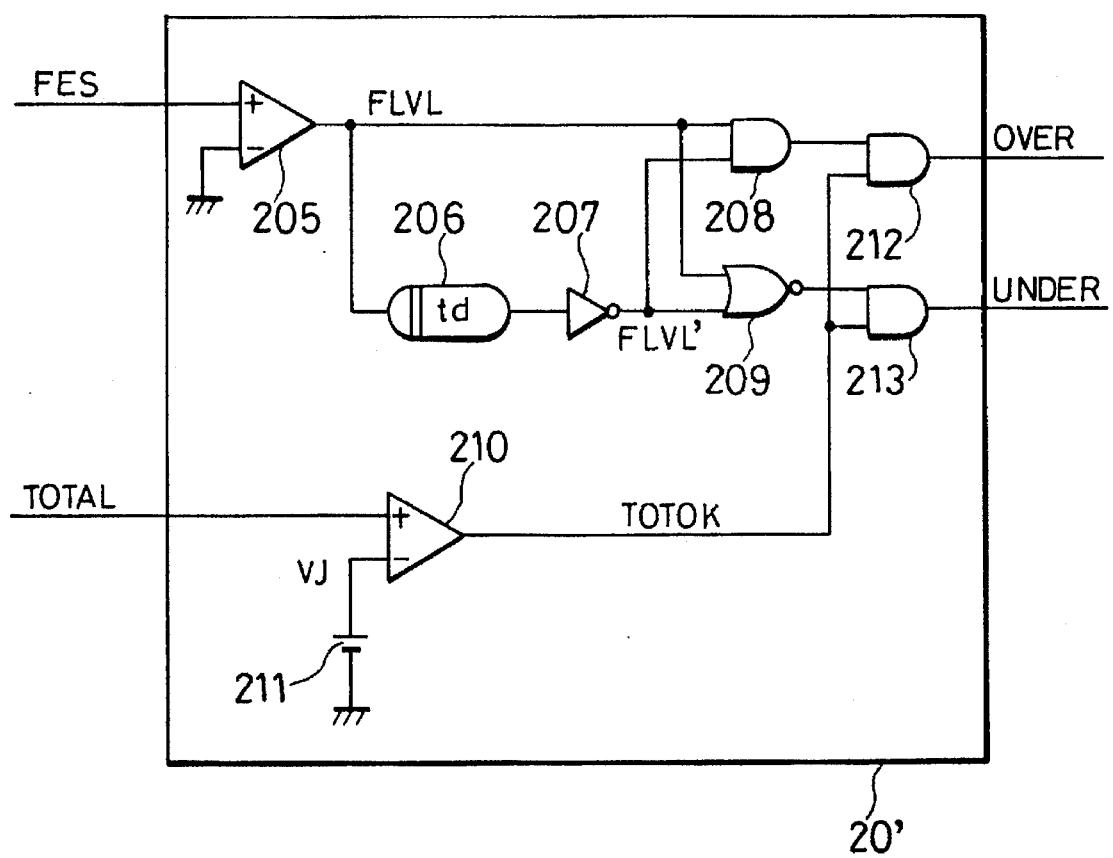
FIG. 16 is a circuit diagram showing an error-direction detection circuit in the focusing control device of FIG. 15.

Referring to FIGS. 15 and 16, the following description will discuss the fourth embodiment of the present invention. Here, for convenience of explanation, those members that have the same functions and that are described in the aforementioned embodiment with reference to its drawings are indicated by the same reference numerals and the description thereof is omitted.

As illustrated in FIG. 15, the focusing control device of the present embodiment is different from those of the first through third embodiments in that both the focus error signal FES and the reflected light signal TOTAL are inputted to the error-direction detection circuit 20'. As illustrated in FIG. 16, the error-direction detection circuit 20' has a construction wherein a comparator 210, a voltage source 211 for generating a reference voltage VJ, and AND gates 212 and 213 are added to the error-direction detection circuit 20 (see FIG. 12) of the third embodiment.

In the present embodiment, the detection of the zero-cross point of the focus error signal FES, which is used for determining the polarity of the offset signal VOFF, is made only in the proximity of the just-focus position; this makes it possible to further prevent any erroneous detection of the zero-cross point in the out-focus state wherein the focus error signal measures virtually zero.

A signal TOTOK to be inputted to the AND gates 212 and 213 is obtained by comparing the reflected light signal TOTAL with the reference voltage VJ in the comparator 210. Since the reflected light signal TOTAL goes low in the out-focus state, the signal TOTOK has the logic "L" level. As a result, the AND gates 212 and 213 block the outputs from the AND gate 208 and the NOR gate 209 that are located before them, thereby stopping the signal OVER and the signal UNDER.

Therefore, the error-direction detection circuit 20' of the present embodiment reduces the possibility of erroneous detection of the zero-cross point in comparison with the error-direction detection circuit 20 of the third embodiment. This construction allows the polarity of the offset signal VOFF to be determined with higher reliability.

In the above-mentioned embodiments, explanations were given based on the assumption that the focus error signal FES should change to the plus side or to the minus side with grounded voltage (0 V) defined as a reference voltage Vref (the third reference voltage); yet, the present embodiments are not limited to this arrangement. For example, when a single power source of +5 V is employed, the intermediate voltage (for example, +2.5 V) between 0 V and +5 V may be used as the reference voltage Vref of the focus error signal FES. In this case, the focus error signal FES varies within a range from 0 V to +5 V with the reference voltage Vref at the central value; therefore, the reference voltage +VF1 may be determined as a plus voltage greater than the reference voltage Vref while a second reference voltage −E may be determined as a plus voltage lower than the reference voltage Vref.

As described above, by using a simple construction which eliminates the necessity of having to adjust the time constant depending on an optical disk to be used, the arrangement of the present embodiment makes it possible to generate the offset signal VOFF even at a position other than the proximity of the just-focus position so as to be added to the focus error signal FES. Thus, the lens 4 is always driven toward the just-focus position from the out-focus position; this eliminates failure in the focus pull-in operation.

[FIFTH EMBODIMENT]

Figure 17:
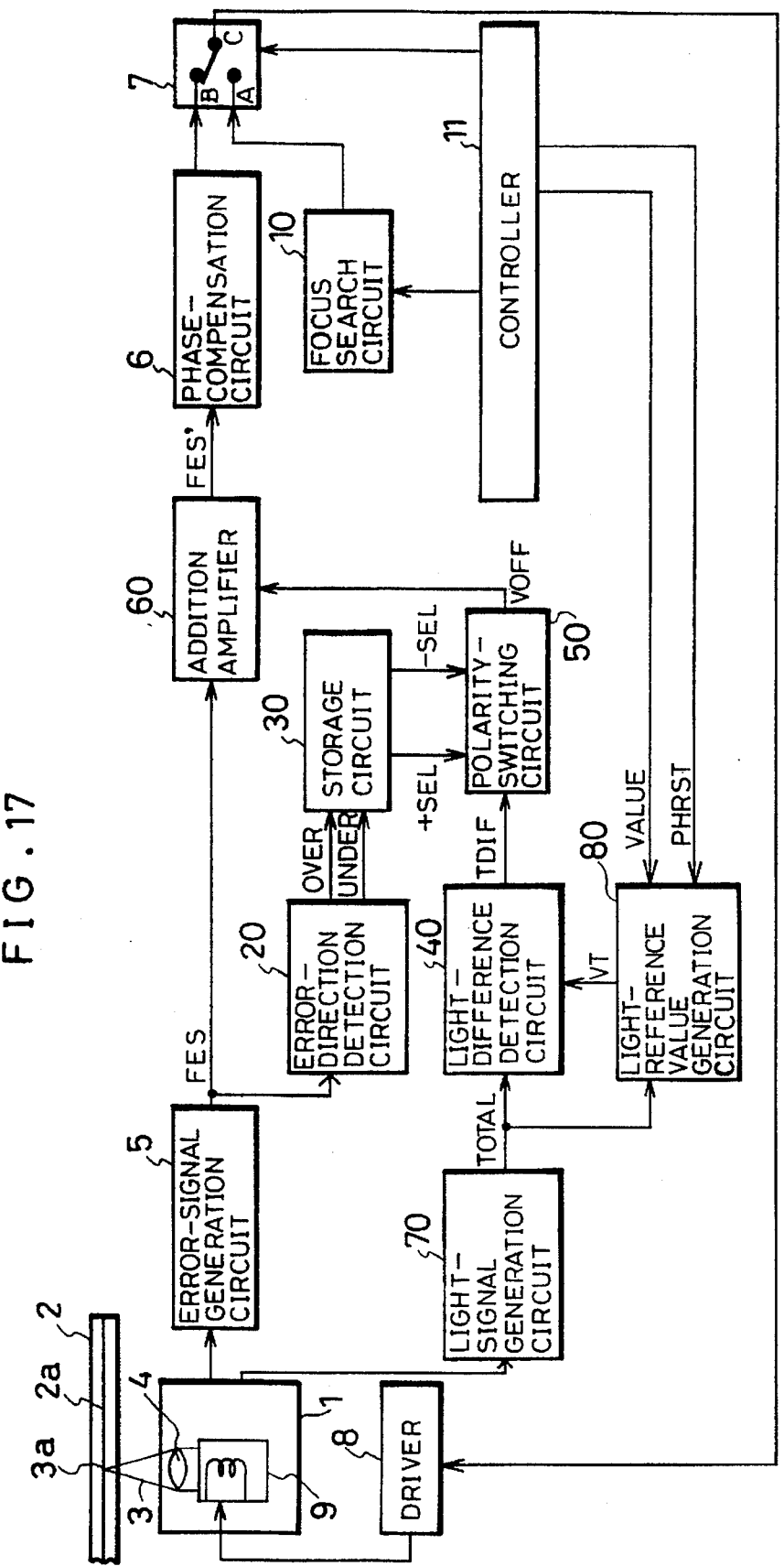
FIG. 17 is a block diagram showing still another structural example of the focusing control device of the present invention.
Figure 18:
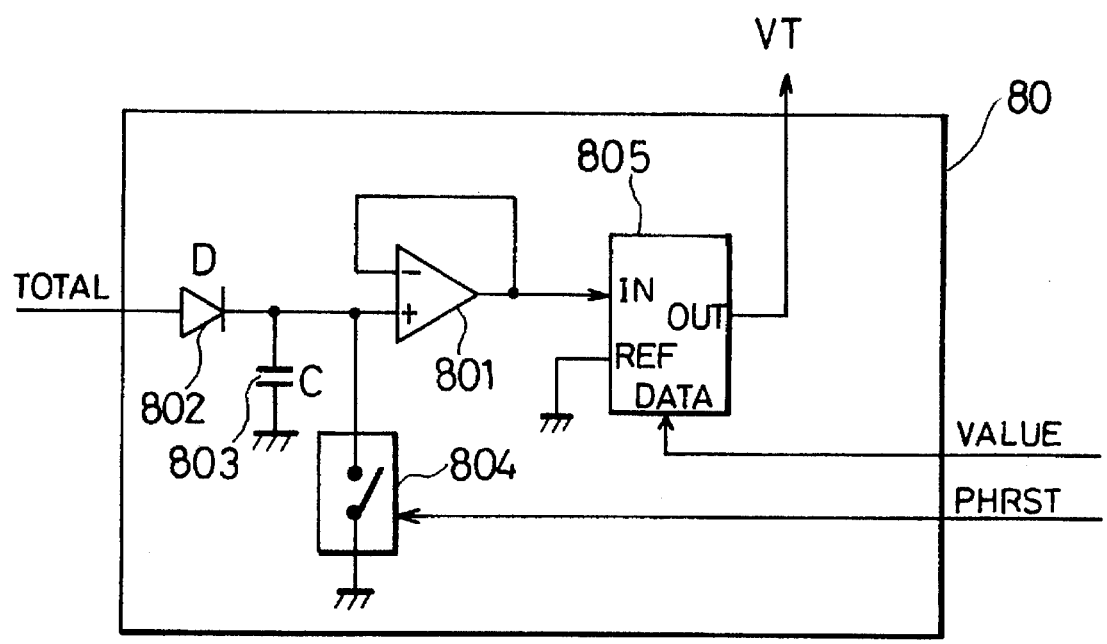
FIG. 18 is a circuit diagram showing a light-reference-value generation circuit in the focusing control device of FIG. 17.

Referring to FIGS. 17 and 18 as well as FIGS. 19(a) through 19(i), the following description will discuss the fifth embodiment of the present invention. Here, for convenience of explanation, those members that have the same functions and that are described in the aforementioned embodiment with reference to its drawings are indicated by the same reference numerals and the description thereof is omitted.

The focusing control device of the present embodiment is different from the first through fourth embodiments in that a light reference value generation circuit 80, which generates a reference value VT of light signal that is inputted to the light-difference detection circuit 40, is provided therein. As illustrated in FIG. 17, the reflected light signal TOTAL released from the light signal generation circuit 70 is inputted to the light reference value generation circuit 80, and the reference value VT is formed in accordance with the reflected light signal TOTAL.

As illustrated in FIG. 18, the light reference value generation circuit 80 is provided with: a peak hold circuit consisting of a diode 802 and a capacitor 803 for holding a maximum value of the reflected light signal TOTAL; a buffer amplifier 801; a multiplication-type D/A converter 805 for voltage-dividing the output of the buffer amplifier 801; and a switch 804 for resetting the peak hold circuit. The multiplication-type D/A converter 805 is provided with an IN-terminal for input use, an OUT-terminal for output use, an REF terminal to which a reference voltage is applied, and a DATA terminal. To the DATA terminal is supplied digital data VALUE, which will be described later, from the controller 11. Moreover, to the switch 804 is supplied, on demand, a signal PHRST for resetting the peak hold circuit, from the controller 11.

The multiplication-type D/A converter 805 subtracts the reference voltage value given to the REF terminal from the voltage value given to the IN-terminal for input use. After multiplying the resulting subtracted value by the numeric value of the digital data VALUE given to the DATA terminal, the multiplication-type D/A converter 805 again adds the reference voltage value to the resulting value, and releases the result of the addition from the OUT-terminal. Here, the numeric value of the digital data VALUE is regarded as a certain coefficient; yet, especially in the present embodiment, it is used as a coefficient for generating the reference value VT from the reflected light signal TOTAL.

Thus, the multiplication-type D/A converter 805 functions as a variable resistor or an attenuator, wherein a certain digital setting is acceptable. If the digital data VALUE to the DATA terminal is zero, the reference voltage of the REF terminal (0 V in FIG. 18) is released from the OUT-terminal. Further, if the digital data VALUE has a maximum value (ffor example, 255 in the case of the multiplication-type D/A converter of 8-bit type), a voltage obtained by adding the voltage of the signal given to the IN-terminal to the reference voltage of the REF terminal is released from the OUT-terminal. In FIG. 18, since the reference voltage is zero volt, the voltage of the signal given to the IN-terminal is released, as it is.

In the above-mentioned arrangement, the light reference value generation circuit 80 holds a maximum value of the reflected light signal TOTAL that appears during the first focus search operation by the use of the diode 802 and the capacitor 803. Therefore, if the controller 11 sets the digital data VALUE in the multiplication-type D/A converter 805 preliminarily prior to the focus search operation, the reference value VT is determined at the time when the reflected light signal TOTAL reaches the maximum value, as shown in FIG. 19(b).

Although different depending on the reflectance and the construction of the optical disk, if the initial value of the digital data VALUE is set so that a value in the order of 50–70 percent of the maximum value of the reflected light signal TOTAL is released as the reference value VT, no problem is raised in the focus search operation and the focus pull-in operation. It is important to make the reference value VT smaller than the maximum value of the reflected light signal TOTAL by setting the digital data VALUE properly.

The following description will discuss the merits obtained by replacing the voltage source 41 of FIG. 3 with the light reference value generation circuit 80.

For example, as was described in the first embodiment, if the reference value VT is fixed to a constant value by the voltage source 41, a voltage (VT−TOTAL) is always kept released as the signal TDIF (see FIG. 9(g)) in the case where the reference voltage VT is higher than the maximum value of the reflected light signal TOTAL. The signal TDIF is added to the focus error signal FES as the offset signal VOFF by the polarity switching circuit 50; this causes adverse effects on the focus pull-in operation and the focus servo operation in the proximity of the just-focus position.

Conversely, if the reference value VT is fixed to, for example, a very low voltage close to zero, the signal TDIF is not released, or released in a very low value, even in the out-focus state; this may reduce the effect of bringing the lens 4 from the out-focus position back to the just-focus position.

However, the reference value VT of the present embodiment is generated so that it has a value smaller than the maximum value based on the maximum value of the reflected light signal TOTAL; therefore, as shown in FIG. 19(g), the signal TDIF becomes zero around the maximum value of the reflected light signal TOTAL, that is, in the proximity of the just-focus position, and is released properly only in the out-focus position. Therefore, in accordance with the present embodiment, the above-mentioned problem is not raised even if the reflected light signal TOTAL varies depending on optical disks, or even if the reference value VT varies.

Additionally, in the first out-focus state at the start of the focus search operation, since the reference value VT has not been determined and since the signal TDIF has not been generated, the offset signal VOFF and the signal FES' remain zero as shown in FIGS. 19(h) and 19(i).

Figure 20:
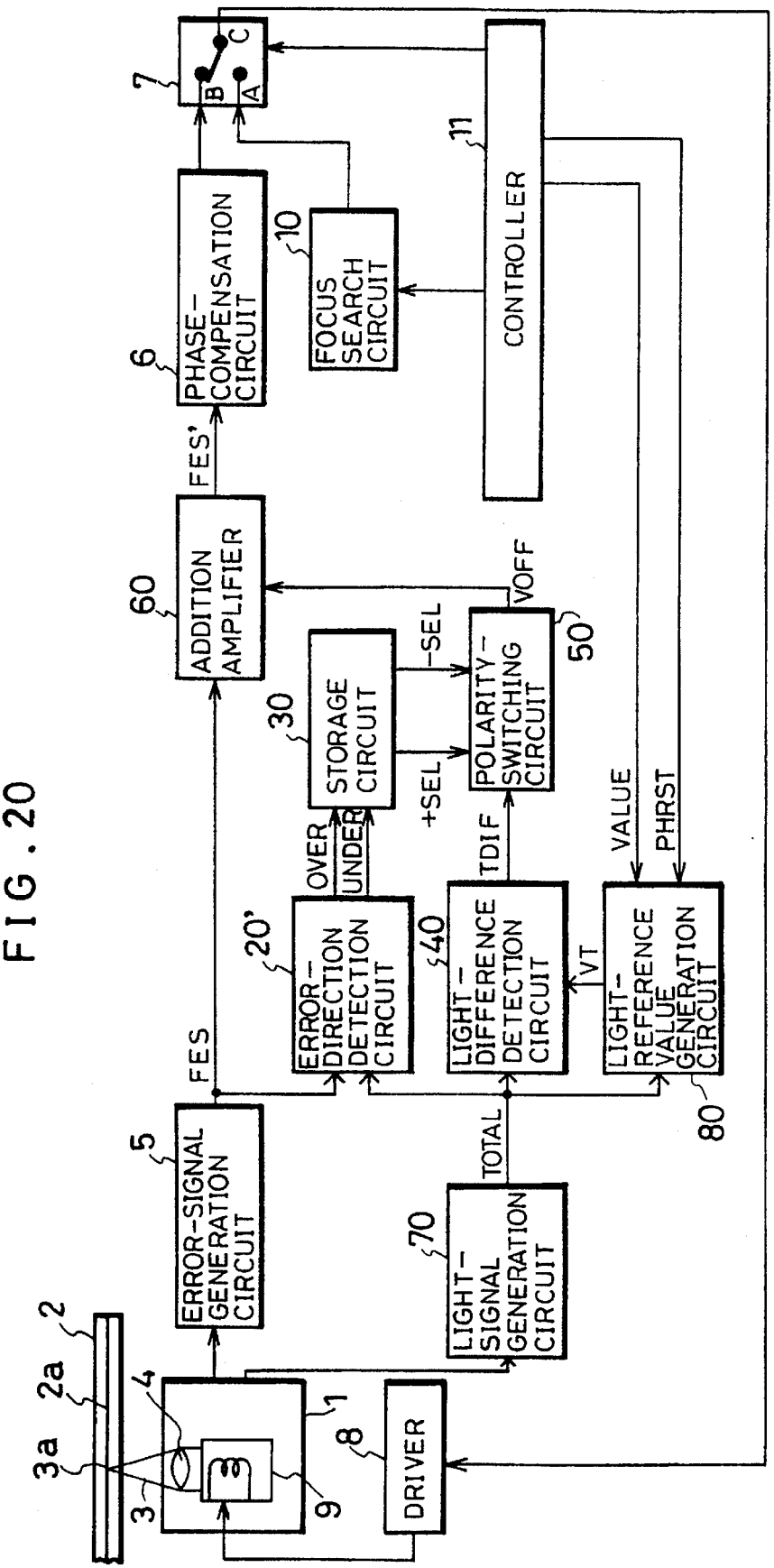
FIG. 20 is a block diagram showing still another structural example of the focusing control device of the present invention.

Further, as illustrated in FIG. 20, the error-direction detection circuit 20 of the focusing control device, shown in FIG. 17, may be replaced by the error-direction detection circuit 20' (see FIG. 16) of the fourth embodiment. In the case of determining the polarity of the signal +SEL (or −SEL) based on the zero-cross of the focus error signal FES, this arrangement reduces the possibility of erroneous detection of the zero-cross, thereby ensuring high reliability in determining the polarity of the offset signal VOFF.

Figure 21:
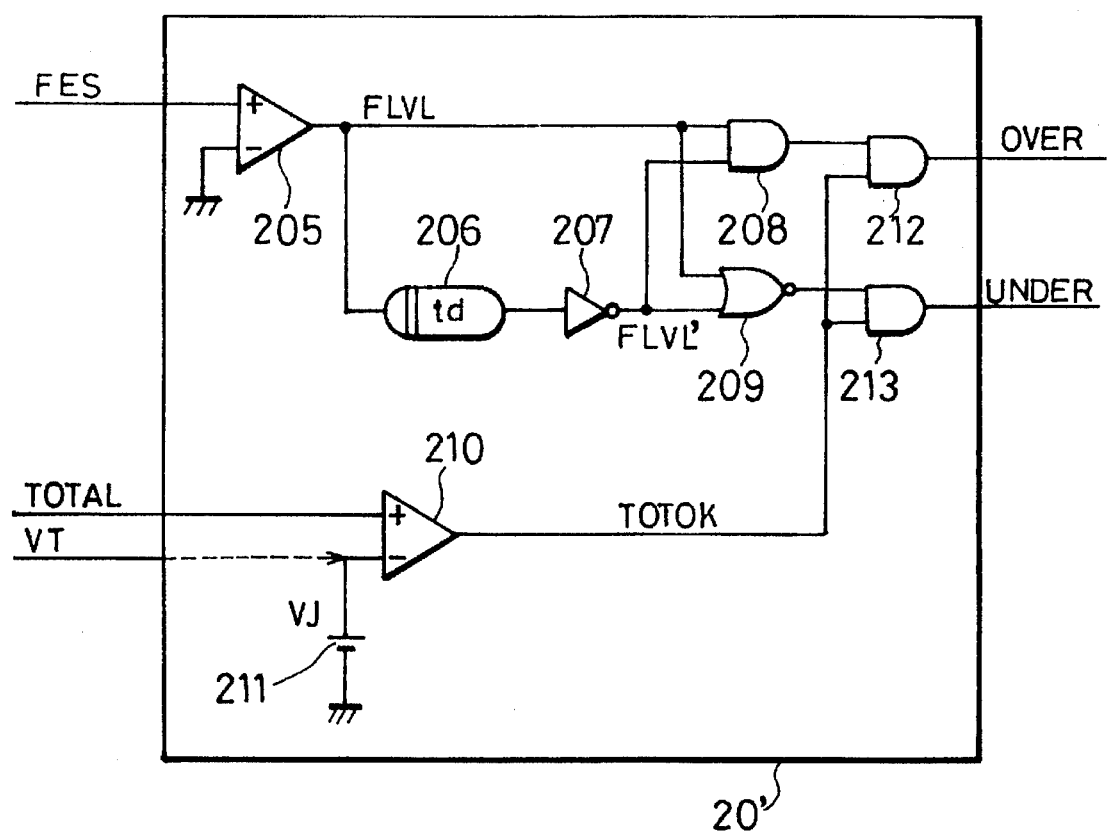
FIG. 21 is a circuit diagram showing another error-direction detection circuit that is used in the focusing control device of FIG. 20.

Moreover, as illustrated in FIG. 21, instead of the arrangement wherein the inverting input of the comparator 210 is connected to the voltage source 211 one end of which is connected to ground, that is, zero volt, the inverting input may be connected to the OUT-terminal of the light reference value generation circuit 80. In this case, the reference value VT is given to the inverting input of the comparator 210 as the reference voltage. As has already been described, the function of the comparator 210 and the voltage source 211 is to detect the proximate range to the just-focus position wherein the reflected light signal TOTAL goes higher than a predetermined reference level, in order to prevent erroneous detection of the zero-cross of the focus error signal in the out-focus state. The voltage VJ of the voltage source 211 determines this reference level. However, as explained in the present embodiment, the reference value VT is set to be smaller than the maximum value of the reflected light signal TOTAL, in other words, to be lower than the reflected light signal TOTAL in the proximity of the just-focus position. Therefore, instead of the voltage VJ, it is possible to use the reference value VT as a reference voltage to be compared with the reflected light signal TOTAL.

[SIXTH EMBODIMENT]

Referring to FIGS. 22(a) and 22(b), FIGS. 23 through 28, and FIGS. 29(a) through 29(i), the following description will discuss the sixth embodiment of the present invention. Here, for convenience of explanation, those members that have the same functions and that are described in the aforementioned embodiment with reference to its drawings are indicated by the same reference numerals and the description thereof is omitted.

In the foregoing embodiments, all the signals including the focus error signal FES, the reflected light signal TOTAL, etc. vary using 0 volt as a reference, and the focus servo operation is also conducted with respect to the just-focus position where the focus error signal FES becomes zero. In other words, in the foregoing embodiments, explanations were given on the focusing control device wherein the reference voltage of the signals was set to zero.

However, in a device wherein a single power source for supplying only a voltage of, for example, +5 V, is provided, the reference voltage of signals may be set between the source voltage of +5 V and 0 V, and an arrangement may be made so that the signals vary within a range from 0 V to the source voltage with the reference voltage set in the center. Here, in the present embodiment, an explanation will be given on an example wherein the present invention is adopted in a focusing control device whose reference voltage of signals is not 0 V. Additionally, the following explanation will discuss the case wherein the reference voltage is plus and the voltage supplied by the single power source is only plus.

FIGS. 22(a) and 22(b) show a relationship between the focus error signal FES and the reflected light signal TOTAL in the device which is operated by the single power source. Different from FIGS.1(a) and 1(b), both the focus error signal FES and the reflected light signal TOTAL vary based on the reference voltage VR that is not 0 V. Therefore, the focus error signal FES of FIG. 23(a) is also shaped by the signal TDIF and the offset signal VOFF, which vary in relation to the reference voltage VR as shown in FIGS. 23(c) and 23(d), into a signal FES' which varies in relation to the reference voltage VR as shown in FIG. 23(e).

The just-focus position represents a point where FES' =VR≠0 holds, and the focus servo operation is carried out so that FES'=VR holds. In the out-focus state, the signal FES' is not equal to the reference voltage VR, and is arranged to have a relative plus or minus polarity with respect to the reference voltage VR depending on whether the out-focus position in question is located on the NEAR side or the FAR side.

Here, FIG. 23(b), which shows the reference value VT and the reflected light signal TOTAL together, also shows the difference voltage VH (=VT−VR) between the reference value VT and the reference voltage VR, for convenience of explanation.

The block diagram of the focusing control device of the present embodiment is omitted because it is identical to, for example, the block diagram of FIG. 17; however, its respective circuits, which constitute its structural elements, are slightly different from those of FIG. 17 because its reference voltage of the signals is not 0 V, but VR.

Figure 24:
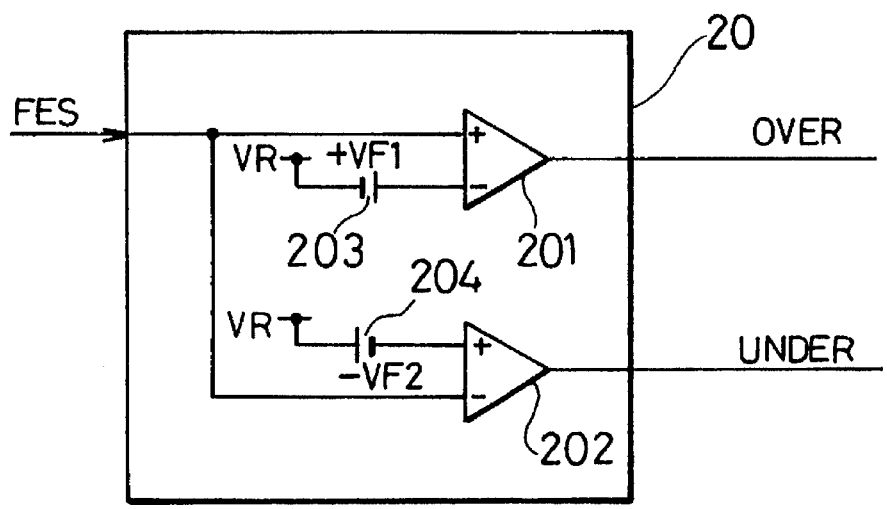
FIG. 24 is a circuit diagram that shows an error-direction detection circuit used in the focusing control device that is operated by a single power source.

FIG. 24 shows a construction of the error-direction detection circuit 20 of the present embodiment. The difference between the error-direction detection circuit 20 and that shown in FIG. 4 is that the voltage sources 203 and 204 for supplying comparative voltages to the comparators 201 and 202 are connected to the reference voltage VR. For this reason, the comparative voltages are respectively equal to (VR+VF1) and (VR−VF2). Therefore, when the focus error signal FES goes higher than the voltage that is higher than the reference voltage VR by VF1, the signal OVER is released, and when the focus error signal FES goes lower than the voltage that is lower than the reference voltage VR by VF2, the signal UNDER is released.

Figure 25:
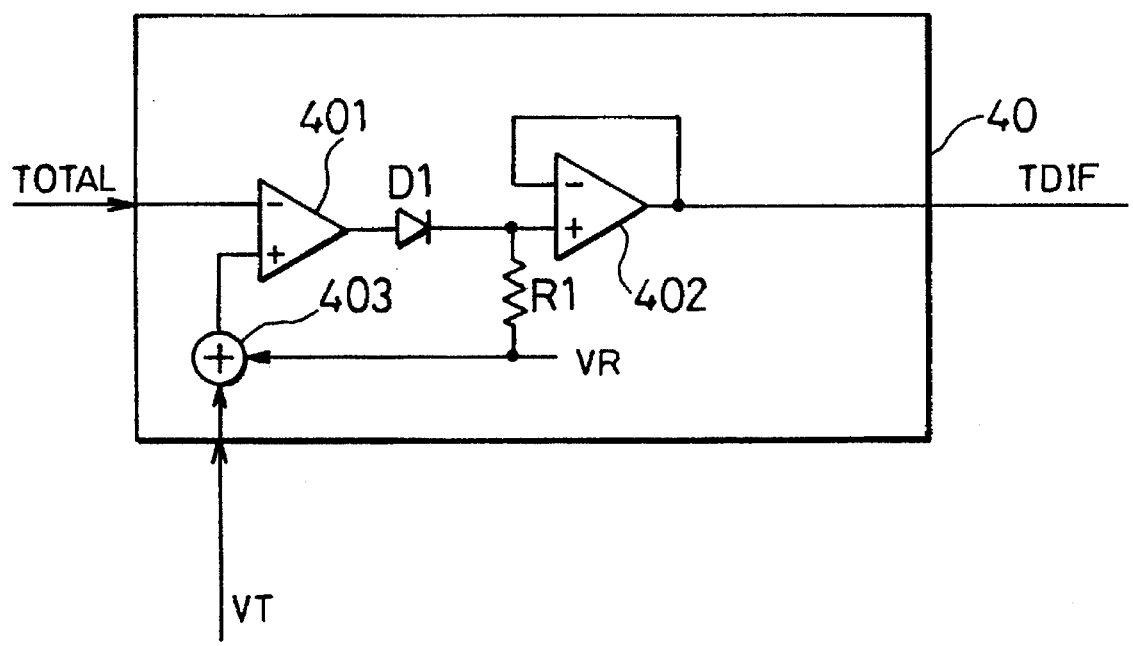
FIG. 25 is a circuit diagram that shows a light-difference detection circuit used in the focusing control device that is operated by a single power source.

As illustrated in FIG. 25, the light-difference detection circuit 40 of the present embodiment has almost the same construction as that of FIG. 6; however, it is different therefrom in the following points: an addition circuit 403 is further provided; after the reference value VT and the reference voltage VR are added in the addition circuit 403, the resulting value is supplied to the differential amplifier 401; and one of the resistor R1 is connected to the reference voltage VR.

The output of the differential amplifier 401 is represented by (VR+VT−TOTAL); however, the voltage which develops across the resistor R1 through the diode D1 is represented by (VT−TOTAL)+VR only when (VR+VT−TOTAL) >VR, that is, (VT−TOTAL)>0 holds, and is represented by the constant value VR when (VR+VT−TOTAL)≦VR, that is, (VT−TOTAL)≦0 holds. Therefore, by adding the reference voltage VR to the reference value VT beforehand in the addition circuit 403, the signal TDIF is generated by adding the reference voltage VR to (VT−TOTAL) only when the reference value VT exceeds the reflected light signal TOTAL. With this arrangement, even when the reflected light signal TOTAL exceeds the reference value VT, it is not necessary to provide the output of the differential amplifier 401 as a minus voltage; therefore, no contradiction occurs in the operation of the present embodiment wherein only the plus power supply voltage is used.

Figure 26:
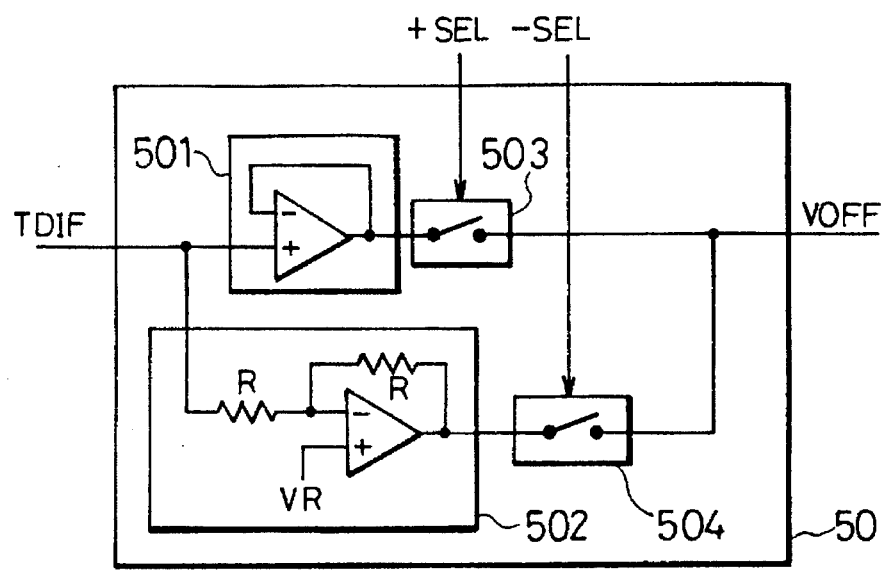
FIG. 26 is a circuit diagram that shows a polarity-switching circuit used in the focusing control device that is operated by a single power source.

FIG. 26 shows a construction of the polarity switching circuit 50. The difference from the construction of FIG. 7(b) is that the non-inverting input of the OP amplifier 501 installed therein is connected not to 0 V, but to the reference voltage VR, in order to allow the non-inverting amplifier 502 to release the difference between the signal TDIF and the reference voltage VR as a signal having the inverted polarity in relation to the reference voltage VR. The non-inverting amplifier 501, which is only required to release the signal TDIF, as it is, as an offset voltage, may be simply constructed by a buffer amplifier (or a voltage follower).

Figure 27:
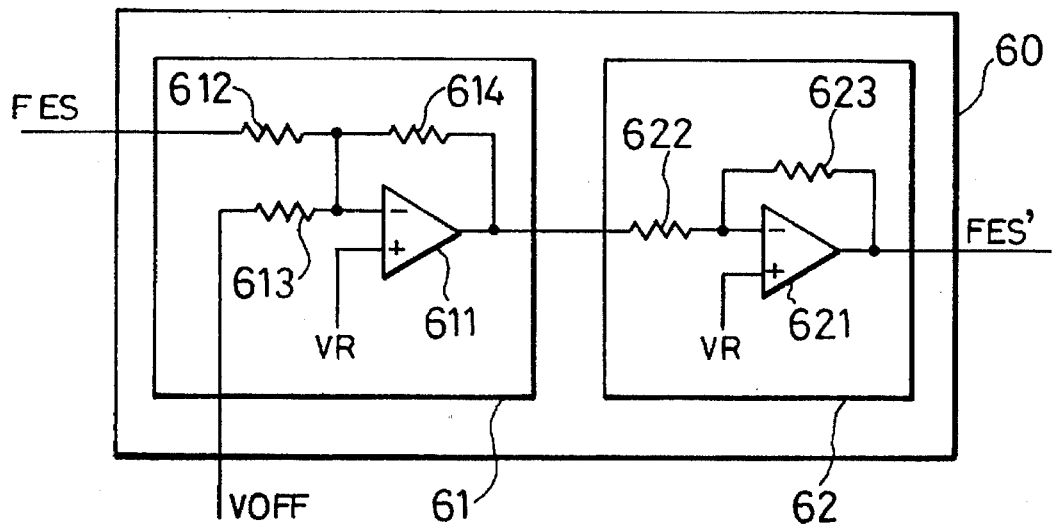
FIG. 27 is a circuit diagram that shows an addition amplifier used in the focusing control device that is operated by a single power source.

FIG. 27 shows a construction of the addition amplifier 60. Circuit elements used therein are identical to those of the constructions shown in FIGS. 8 and 27; however, the difference lies in that the non-inverting inputs of the OP amplifiers 611 and 621 are connected to the reference voltage VR so that the focus error signal FES and the offset signal VOFF, which are inputted thereto, as well as the signal FES' released therefrom are all formed based on the reference voltage VR.

Figure 28:
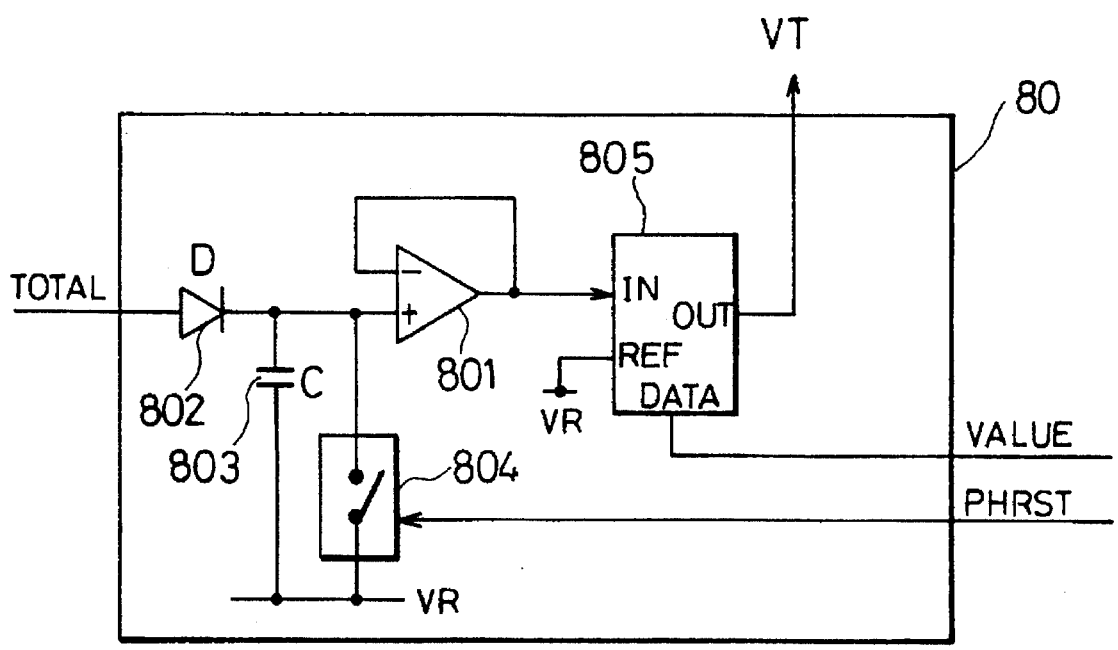
FIG. 28 is a circuit diagram that shows a light-reference-value generation circuit used in the focusing control device that is operated by a single power source.

The light reference value generation circuit 80 of FIG. 28 has the same construction as that of FIG. 18; however, the difference lies in that one end of the capacitor 803, one end of the switch 804, and the REF terminal of the multiplication-type D/A converter 805 are connected to the reference voltage VR. Since the reflected light signal TOTAL is a signal that varies based on the reference voltage VR, a maximum value of (TOTAL−VR) is held in the diode 802 and the capacitor 803, and is reset to the reference voltage VR when the switch 804 is turned on. Further, the multiplication-type D/A converter 805 multiplies the reflected light signal TOTAL by a coefficient based on the reference voltage VR, and releases a reference value VT based on the reference voltage VR. For this reason, when the digital data VALUE to be given to the DATA terminal as the coefficient has a maximum value, the reflected light signal TOTAL based on the reference voltage VR is released, virtually as it is, and when the digital data VALUE is zero, the reference value VR is released, as it is. FIGS. 29(a) through 29(i) show operational timing of a focusing control device, shown in FIG. 3, for use in an optical disk apparatus, which is constructed by using the respective circuits as described above.

Since the basic operations have been explained by reference to FIGS. 19(a) through 19(i), the detailed explanations thereof are omitted. The respective signals FES and TOTAL as well as the reference value VT, shown in FIGS. 29(a) and 29(b), are formed based on the reference voltage VR; therefore, the output TDIF of the light-difference detection circuit 50 is also a signal that is formed based on the reference voltage VR, as shown in FIG. 29(g). The variation of the signal TDIF is represented by (VT−VR+VR)=(VH+VR), that is, VH. The output VOFF, which is obtained by switching the polarity of the signal TDIF in the polarity switching circuit 50, is also given as a signal that varies within a range from plus VH to minus VH at its maximum in relation to the reference voltage VR, as shown in FIG. 29(h). The signal FES', shown in FIG. 29(i), also coincides with the reference voltage VR in the just-focus position, and varies based on the reference voltage VR in the same manner as the off-set signal VOFF in the out-focus state.

Moreover, the construction of FIG. 12 may be applied to the error-direction detection circuit 20, and by not detecting the peak of the focus error signal FES, but detecting the point at which the focus error signal FES and the reference voltage VR cross, that is, the just-focus position, the signal OVER or UNDER may be generated. In this case, although not shown in the drawings, the reference voltage of the focus error signal FES is VR that is not 0 V; therefore, the inverting input of the hysteresis comparator 205 of FIG. 12 is connected to the reference voltage VR.

Furthermore, the construction of FIG. 16 may be applied to the error-direction detection circuit 20, and the point at which the focus error signal FES and the reference voltage VR cross may be detected only at the time when the reflected light signal TOTAL has exceeded a predetermined value. In this case as well, although not shown in the drawings, the reference voltage of the focus error signal FES and the reflected light signal TOTAL is VR; therefore, the inverting input of the hysteresis comparator 205 of FIG. 16 is connected to the reference voltage VR, and one end of the voltage source 211, the other end of which is connected to the inverting input of the comparator 210, is connected to the reference voltage VR. With this arrangement, since the crossing of the focus error signal FES and the reference voltage VR is detected only in the proximity of the just-focus position at which the reflected light signal TOTAL exceeds (VR+VJ), it is possible to surely prevent erroneous detection of the crossing in the out-focus state.

In the same manner as the construction of the error-direction detection circuit 20' of FIG. 21, the OUT-terminal of the multiplication-type D/A converter 805, shown in FIG. 28, may be connected to the inverting input of the comparator 210, instead of connecting the voltage source 211 thereto. In this case, to the inverting input of the comparator 210 is supplied a reference value VT which is formed based on the reference voltage VR, and is set to be smaller than the maximum value of the reflected light signal TOTAL. This arrangement makes it possible to detect the proximate range of the just-focus position at which the reflected light signal TOTAL exceeds the reference value VT, thereby ensuring high reliability in detecting the crossing of the focus error signal FES and the reference voltage VR.

[SEVENTH EMBODIMENT]

Referring to FIGS. 30 through 34, the following description will discuss the seventh embodiment of the present invention. Here, for convenience of explanation, those members that have the same functions and that are described in the aforementioned embodiment are indicated by the same reference numerals and the description thereof is omitted.

In the aforementioned embodiments, the offset signal VOFF was generated from the signal TDIF that corresponds to the difference between the reflected light signal TOTAL and the reference value VT, and the value of the signal was zero at the proximity of the just-focus position. In contrast, the output of the offset signal VOFF of the present embodiment is synchronized to the output of "H" level of the signals +SEL and −SEL, and the value thereof is not zero at the just-focus position. For this reason, in a focusing control device shown in FIG. 30, after completion of the focus pull-in operation that is executed in accordance with the signal FES', the output of the offset signal VOFF to be added to the focus error signal FES is stopped so that the offset signal VOFF does not interfere with the focus servo operation in the proximity of the just-focus position.

Figure 30:
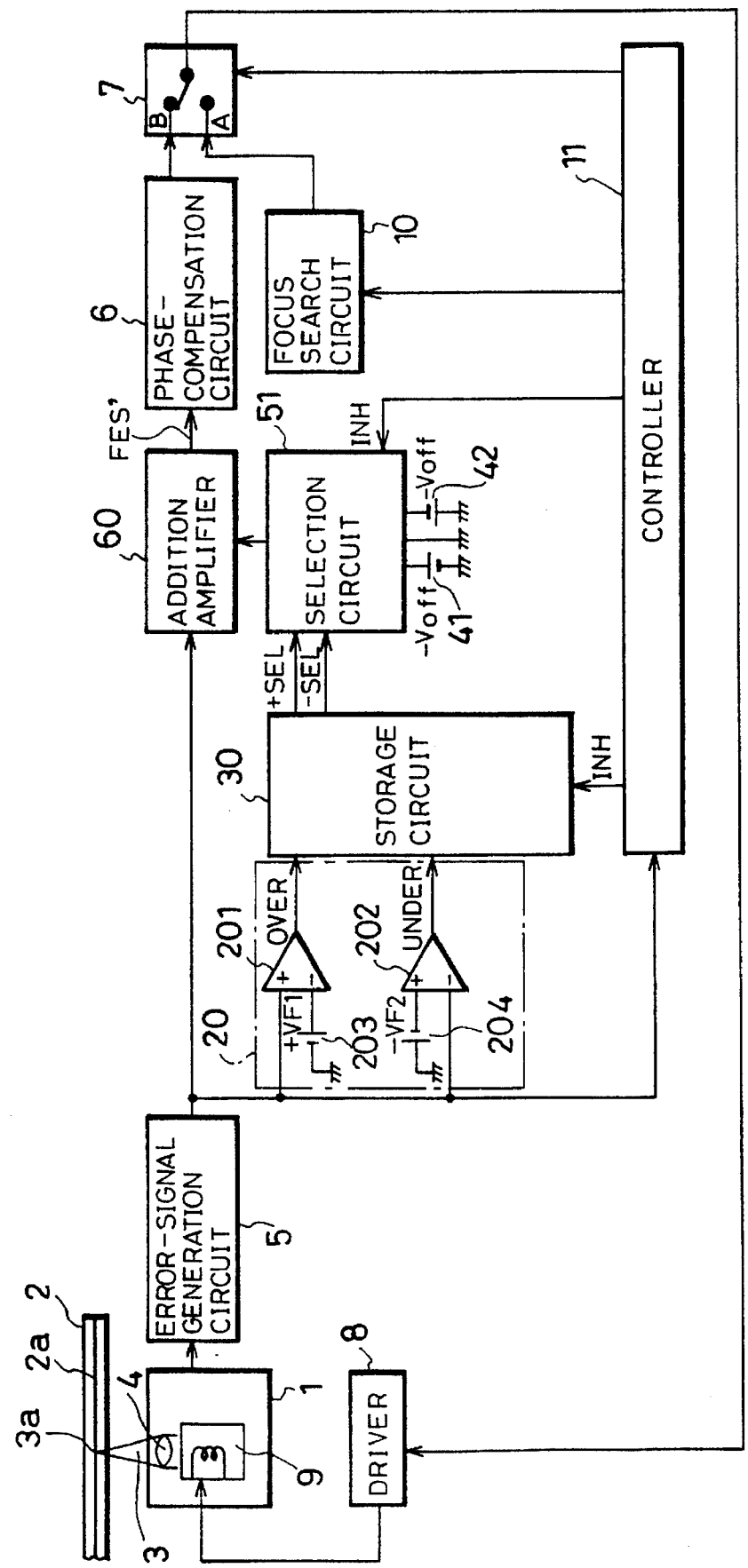
FIG. 30 is a block diagram that shows still another structural example of the focusing control device of the present invention.

The differences between the arrangements of FIG. 30 and FIG. 3 lie in: that the focus error signal FES is inputted to the controller 11; that the controller 11 releases a signal INH for inhibiting the output of the signals +SEL and −SEL to the storage circuit 30; that the arrangement of the storage circuit 30 is changed; and that a selection circuit 51 is installed instead of the polarity-switching circuit 50.

First, an explanation will be given on the storage circuit 30 by reference to FIG. 31. The storage circuit 30 of the present embodiment is provided with AND gates 323 and 324 and a NOT gate 305, in addition to the RS flipflop 31 shown in FIG. 5.

As has already been discussed by reference to FIG. 5, the signal +Q released by the RS flipflop 31 is set by the input of the signal OVER of the logic "H" level, and is reset by the input of the signal UNDER of the logic "H" level. In contrast, the signal −Q released by the RS flipflop 31 is reset by the input of the signal OVER of the logic "H" level, and is set by the input of the signal UNDER of the logic "H" level. These signals +Q and −Q are respectively released as the signals +SEL and −SEL through the AND gates 323 and 324.

Here, the signal INH is inputted to the AND gates 323 and 324 through the NOT gate 305; therefore, when the controller 11 releases the signal INH of the logic "H" level, the NOT gate 305 releases a signal of logic "L" level, thereby closing the AND gates 323 and 324. In other words, regardless of the signals +Q and −Q and the signals OVER and UNDER, neither the signal +SEL nor −SEL is released, thereby keeping the logic "L" level.

Next, an explanation will be given on the arrangement of the selection circuit 51 by reference to FIG. 32. The selection circuit 51 is constituted of three switches 511, 512 and 513, and a NOR gate 514. The terminals of the switches 511, 512 and 513 on one side are connected to one another so as to allow the offset signal VOFF to be released. The other terminal of the switch 511 is connected to an offset voltage source 41 for generating the voltage +Voff, and the other terminal of the switch 512 is connected to an offset voltage source 42 for generating the voltage −Voff. The other terminal of the switch 513 is connected to ground, and maintained at 0 V. Additionally, the switch 513 and the NOR gate 514 may be omitted.

When the signal +SEL of the logic "H" level is inputted, the switch 511 turns on, and when the signal −SEL is inputted, the switch 512 turns on. Further, when neither the signal +SEL nor −SEL is inputted, that is, when both of the signals have the logic "L" level, the output of the NOR gate 514 becomes the logic "H" level, thereby turning on the switch 513.

Referring to FIG. 30 and FIGS. 33(a) through 33(i), the following description will discuss the focus pull-in operation of the focusing control device of the present embodiment. Upon conducting the focus search operation prior to the focus pull-in operation, the controller 11 switches the switch 7 to the terminal A side so that the signal from the focus search circuit 10 is supplied to the driver 8, allows the focus actuator 9 to drive the lens 4, and allows the storage circuit 30 to release the signal +SEL or −SEL by setting the signal INH at the logic "L" level.

As shown in FIGS. 33(d) and 33(e), upon starting the operation, it is not determined which signal is released, the signal +SEL or −SEL, that is, which signal has the logic "H" level. Accordingly, as shown in FIGS. 33(f) and 33(g), the outputs of the offset signal VOFF and the signal FES' are not determined. However, no problem is raised because the levels of the signals +SEL and −SEL are determined when the signal OVER (or the signal UNDER) is first inputted to the storage circuit 30.

When the signal +SEL of the logic "H" level is inputted to the selection circuit 51, the selection circuit 51 selects the offset voltage source 41, thereby releasing the voltage +Voff as the offset signal VOFF (see FIG. 33(f)). Further, when the signal −SEL of the logic "H" level is inputted to the selection circuit 51, the selection circuit 51 selects the offset voltage source 42, thereby releasing the voltage −Voff as the offset signal VOFF. When neither the signal +SEL nor −SEL is inputted to the selection circuit 51, the selection circuit 51 selects 0 V, thereby releasing 0 V as the offset signal VOFF. Here, as has been already explained in the first embodiment, it is impossible in principle for the selection circuit 51 to have the signals +SEL and −SEL inputted at the same time.

The offset signal VOFF and the focus error signal FES (see FIG. 33(a)) are added in the addition amplifier 60 to form the signal FES' (see FIG. 33(g)). The signal FES' does not become 0 V in the out-focus state except for the initial state of the operation. In other words, the signal FES' becomes equal to the voltage −Voff in the FAR area where the lens 4 is far from the recording face 2a, and becomes equal to the voltage +Voff in the NEAR area where the lens 4 is close to the recording face 2a. Therefore, the signal FES' has the polarity by which the focus actuator 9 is driven so that the lens 4 is moved closer to the just-focus position in both the FAR area and the NEAR area. If limited to the proximity of the just-focus position, this polarity is the same as that of the focus error signal FES, which functions so as to bring the lens 4 always to the just-focus position. Therefore, as shown in FIG. 33(h), once the focus servo operation is started with the switch 7 switched to the terminal B side, the lens 4 and the converging position 3a are positioned at the proximity of the just-focus position. Moreover, even if the out-focus state occurs, the lens 4 and the converging position 3a are immediately brought to the proximity of the just-focus position; thus, no failure occurs in the focus pull-in operation.

Meanwhile, when the position of the lens 4 is controlled by the focus servo so that the signal FES' becomes zero, the converging position 3a slightly deviates from the recording face 2a. This is because in accordance with the relationship that the focus error signal FES=the signal FES'− the offset signal VOFF, the focus error signal FES≠0 when the signal FES'=0. Therefore, in order to prevent the offset signal VOFF from interfering with the just-focus control, it is necessary to set the offset signal VOFF at 0 in the proximity of the just-focus position.

For this reason, in the present embodiment, the controller 11 supplies the signal INH shown in FIG. 33(i) to the storage circuit 30 after completion of the focus pull-in operation. Consequently, since both of the outputs of the signals +SEL and −SEL are inhibited, neither the voltage +Voff nor the voltage −Voff is contained in the signal FES'. With this arrangement, the focus error signal FES= the signal FES'=0 holds in the just-focus state; therefore, the focus control is carried out so that the converging position 3a coincides with the just-focus position.

Additionally, the controller 11 judges whether the focus pull-in operation has been completed or not. In the present embodiment, as shown in FIG. 30, the controller 11 receives the focus error signal FES from the error-signal generation circuit 5, and makes a judgement on the completion depending on whether or not the focus error signal FES stays within a predetermined level. In addition to this arrangement, the controller 11 may make the judgement on the completion of the focus pull-in operation depending on, for example, whether or not the levels of the amount of the reflected light from the optical disk 2, the tracking error signal, etc. exceed a predetermined level, or depending on whether or not the information signal and the preformat signal recorded on the optical disk 2 are read out therefrom.

The greater the absolute values of the voltages +Voff and −Voff, the greater the force to be exerted to bring the lens 4 from the out-focus position back to the proximity of the just-focus position during the focus pull-in operation. However, too much absolute values cause a wider deviation of the lens 4 from the just-focus position. This results in adverse effects on the level judgments and read-out of the signals for use in making a judgement on the pull-in operation. For this reason, it is preferable to set the magnitude of the offset signal VOFF to be in the order at which the level of the signal FES' in the out-focus state is at least clearly distinguished from 0 even in the presence of the offset voltage, noise, etc. of the electric circuits.

Figure 31:
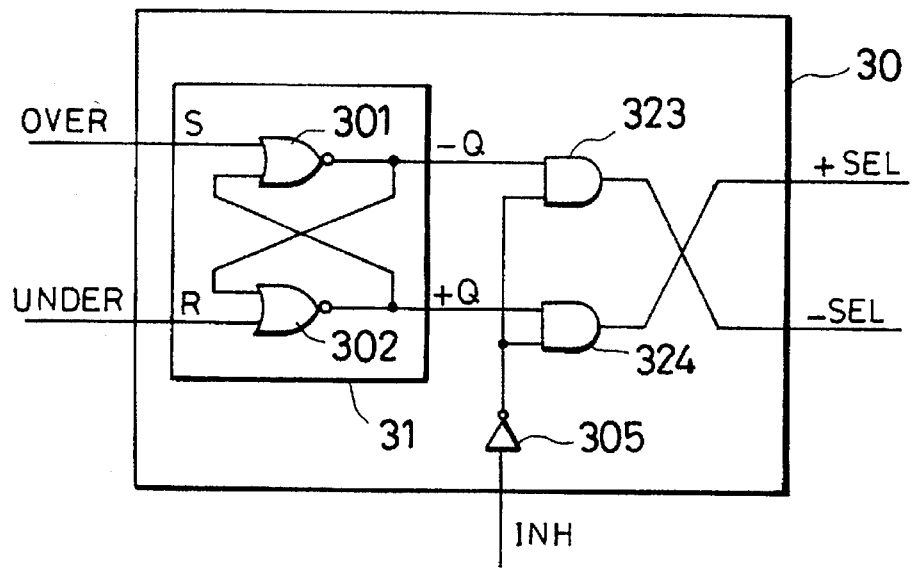
FIG. 31 is a circuit diagram showing a storage circuit in the focusing control device of FIG. 30.
Figure 34:
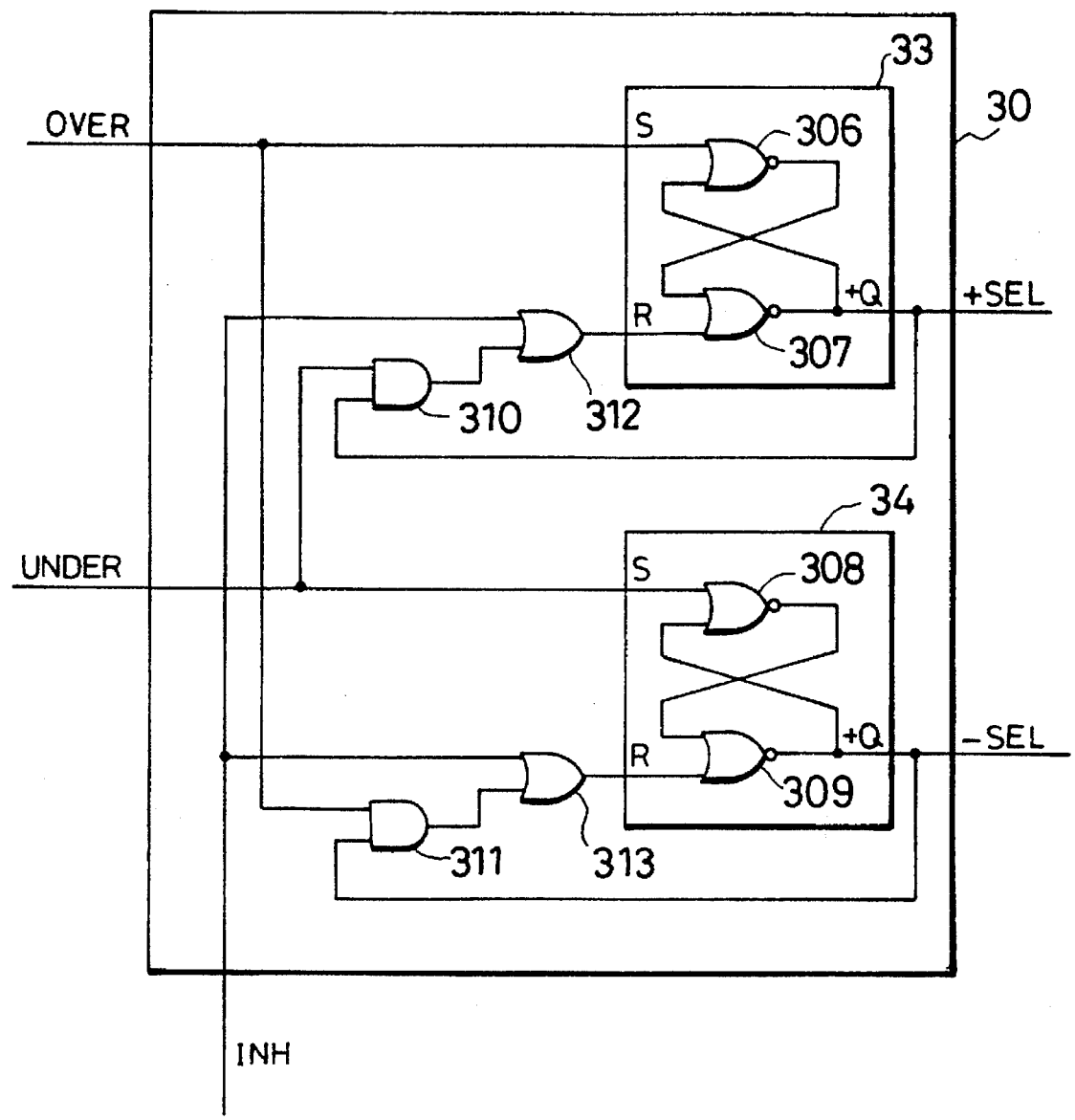
FIG. 34 is a circuit diagram showing another storage circuit that is used in the focusing control device of FIG. 30.

Instead of the storage circuit 30 of FIG. 31, it is possible to adopt a storage circuit 30 shown in FIG. 34 in the present embodiment.

This storage circuit 30 is constituted of: an RS flipflop 33 consisting of NOR gates 306 and 307; an RS flipflop 34 consisting of NOR gates 308 and 309; AND gates 310 and 311; and OR gates 312 and 313.

The signal OVER is added to the input terminal S of the RS flipflop 33, and the signal +SEL is released from the RS flipflop 33. The signal UNDER is added to the input terminal S of the RS flipflop 34, and the signal -SEL is released from the RS flipflop 34. Further, the signal OVER, which is added to the input terminal R of the RS flipflop 34 through the AND gate 311 and the OR gate 313, resets the RS flipflop 34 when the signal -SEL of the logic "H" level is being released, thereby stopping the signal -SEL. In contrast, the signal UNDER, which is added to the input terminal R of the RS flipflop 33 through the AND gate 310 and the OR gate 312, resets the RS flipflop 33 when the signal +SEL is being released, thereby stopping the signal +SEL.

The signal INH, which is added to the input terminals R of the RS flipflops 33 and 34 respectively through the OR gates 312 and 313, resets both of them, thereby inhibiting both the outputs of the signals +SEL and -SEL, that is, setting both the signals +SEL and -SEL to the logic "L" level. Supposing that the signal OVER or the signal UNDER is inputted to the RS flipflops 33 and 34 simultaneously with the signal INH, both of the outputs of the signals +SEL and -SEL are kept in the inhibited state, because the RS flipflops 33 and 34 are respectively constituted of the NOR gates 306 and 307 and the NOR gates 308 and 309.

As described above, the storage circuit 30 of FIG. 34 functions in the same manner as the storage circuit 30 of FIG. 31.

[EIGHTH EMBODIMENT]

Figure 35:
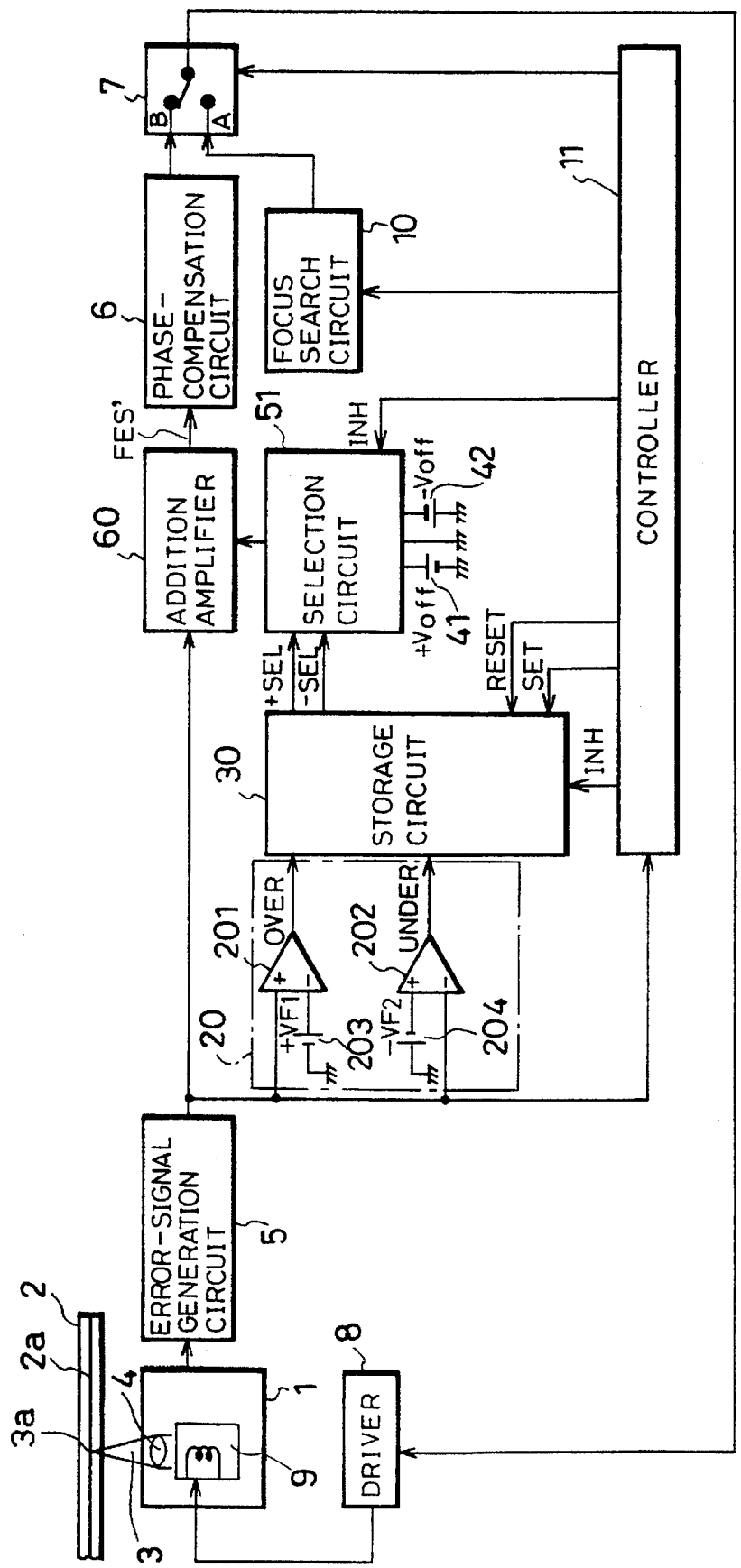
FIG. 35 is a block diagram showing still another structural example of the focusing control device of the present invention.
Figure 36:
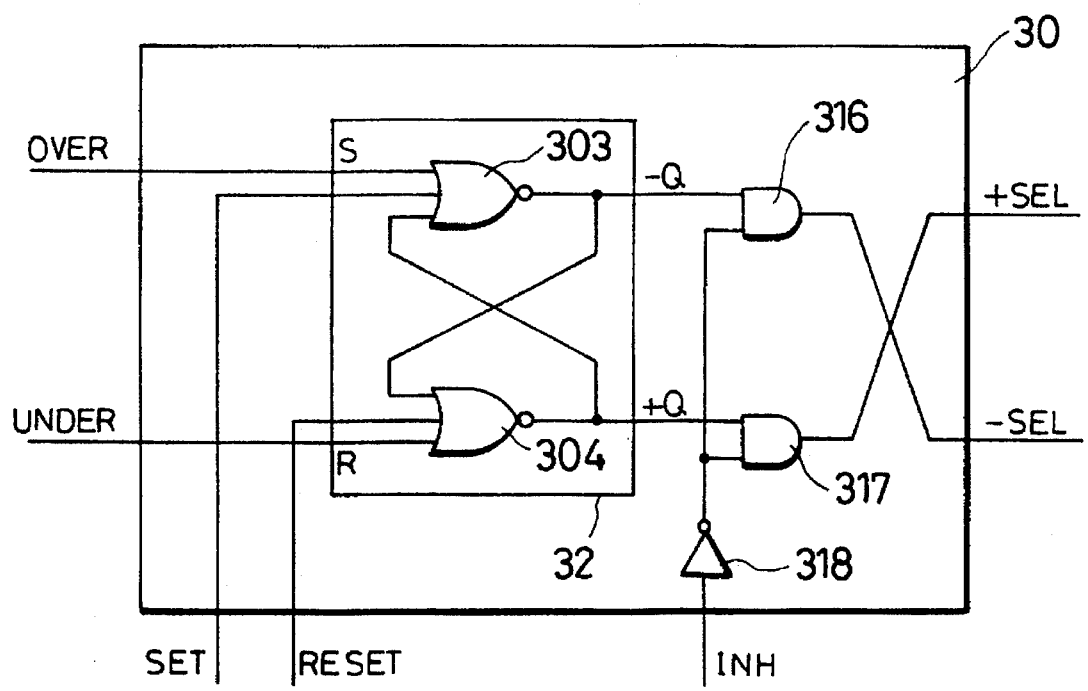
FIG. 36 is a circuit diagram showing a storage circuit that is used in the focusing control device of FIG. 35.

Referring to FIGS. 35 and 36, the following description will discuss the eighth embodiment of the present invention. Here, for convenience of explanation, those members that have the same functions and that are described in the aforementioned embodiment are indicated by the same reference numerals and the description thereof is omitted.

As illustrated in FIG. 35 and FIG. 36, in the focusing control device of the present embodiment, the arrangement of the storage circuit 30 and the connection between the storage circuit 30 and the controller 11 are different from those of the seventh embodiment.

As illustrated in FIG. 36, the storage circuit 30 of the present embodiment is constituted of the RS flipflop 32, which has been described with reference to FIG. 11, AND gates 316 and 317, and a NOT gate 318. From the controller 11, a signal SET of the logic "H" level is inputted to the three-input NOR gate 303 and a signal RESET of the logic "H" level is inputted to the NOR gate 304. As described in the second embodiment, with the arrangement wherein the controller 11 sends the signal SET or the signal RESET of the logic "H" level prior to the focus search operation, it is possible to determine the levels of the signals +SEL and -SEL and consequently to determine the polarity of the offset signal VOFF to be added to the focus error signal FES, immediately after the start of the focus search operation. Therefore, in the same manner as the second embodiment, the focus pull-in operation is simplified as described below.

Suppose the lens 4 to be moved by the controller 11 to a position (within the FAR area) substantially far away from the optical disk 2, where the focus error signal FES ≠0, at the start of the focus search. Here, if the controller 11 releases the signal RESET having the logic "H" level for an instant so as to stop the signal INH, the storage circuit 30 is allowed to release the signal -SEL having the logic "H" level. As a result, the focus error signal FES is added by the voltage -Voff that is supplied as the offset signal VOFF. Thus, the signal FES' has the polarity which allows the lens 4 to move toward the just-focus position. In other words, simply by switching the switch 7 to the terminal B side, the lens 4 is automatically moved toward the just-focus position, and consequently the lens 4 is positioned at the proximity of the just-focus position. Thereafter, the controller 11 releases the signal INH so that the offset signal VOFF is not added to the focus error signal FES.

As described above, in the present embodiment, simply by driving the focus actuator 9, the lens 4 is moved substantially far away from the optical disk 2, and the focus pull-in operation is performed. Therefore, the focus search circuit 10 is not required to release a sinusoidal wave or a triangular wave, but only required to output a dc voltage. This makes it possible to simplify the construction of the focus search circuit 10.

[NINTH EMBODIMENT]

Figure 37:
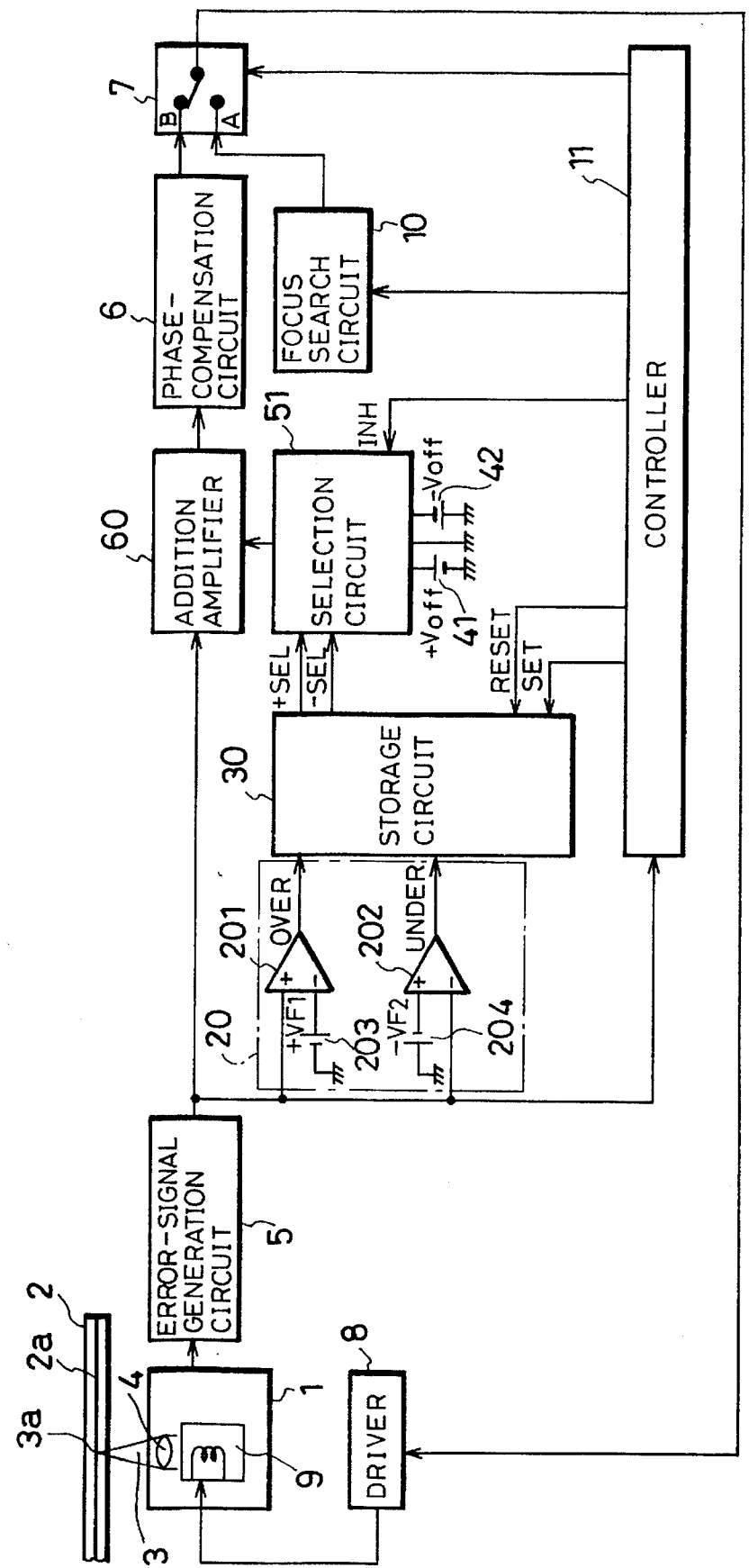
FIG. 37 is a block diagram showing still another structural example of the focusing control device of the present invention.
Figure 38:
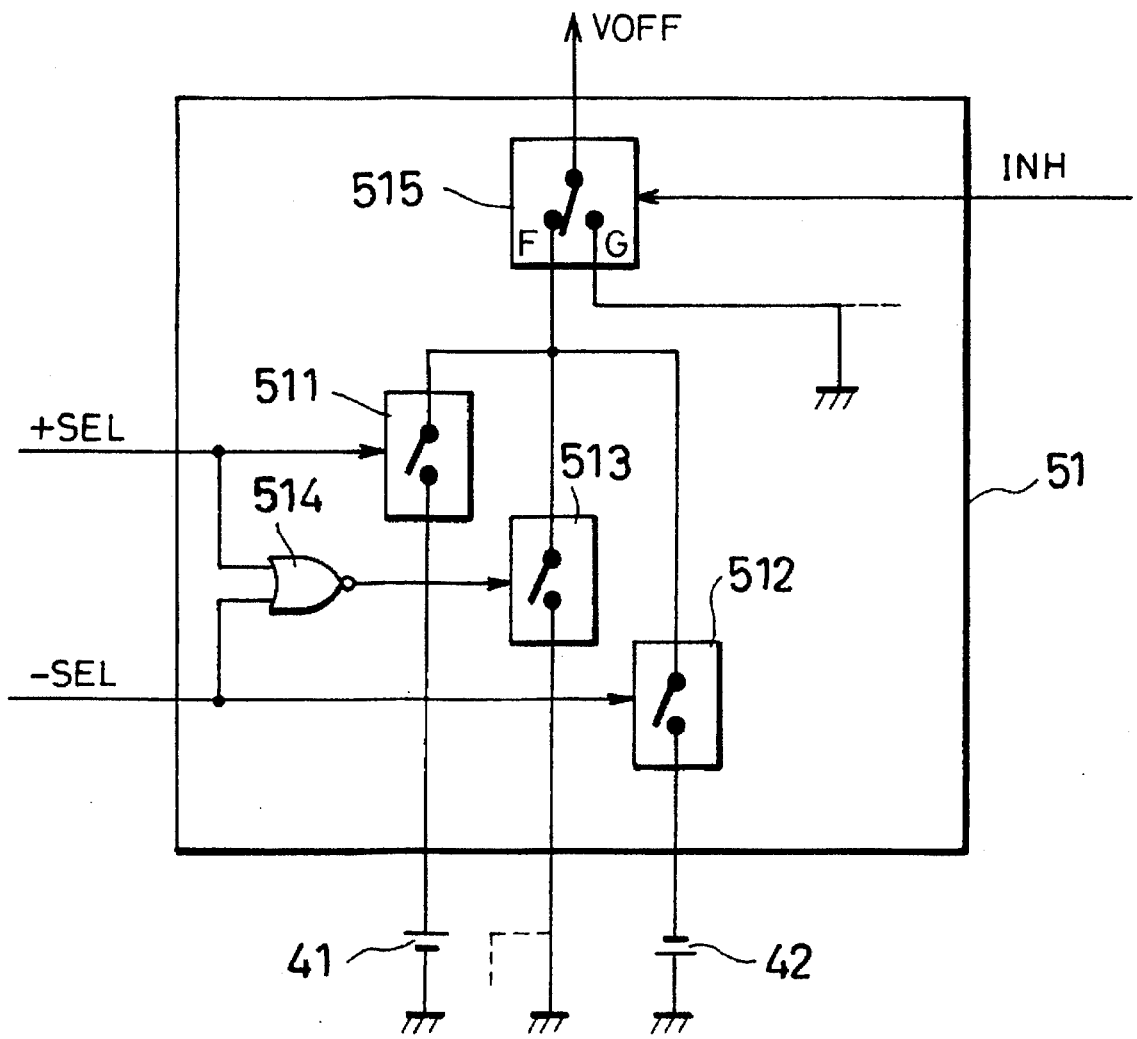
FIG. 38 is a circuit diagram showing a selection circuit that is used in the focusing control device of FIG. 37.
Figure 39:
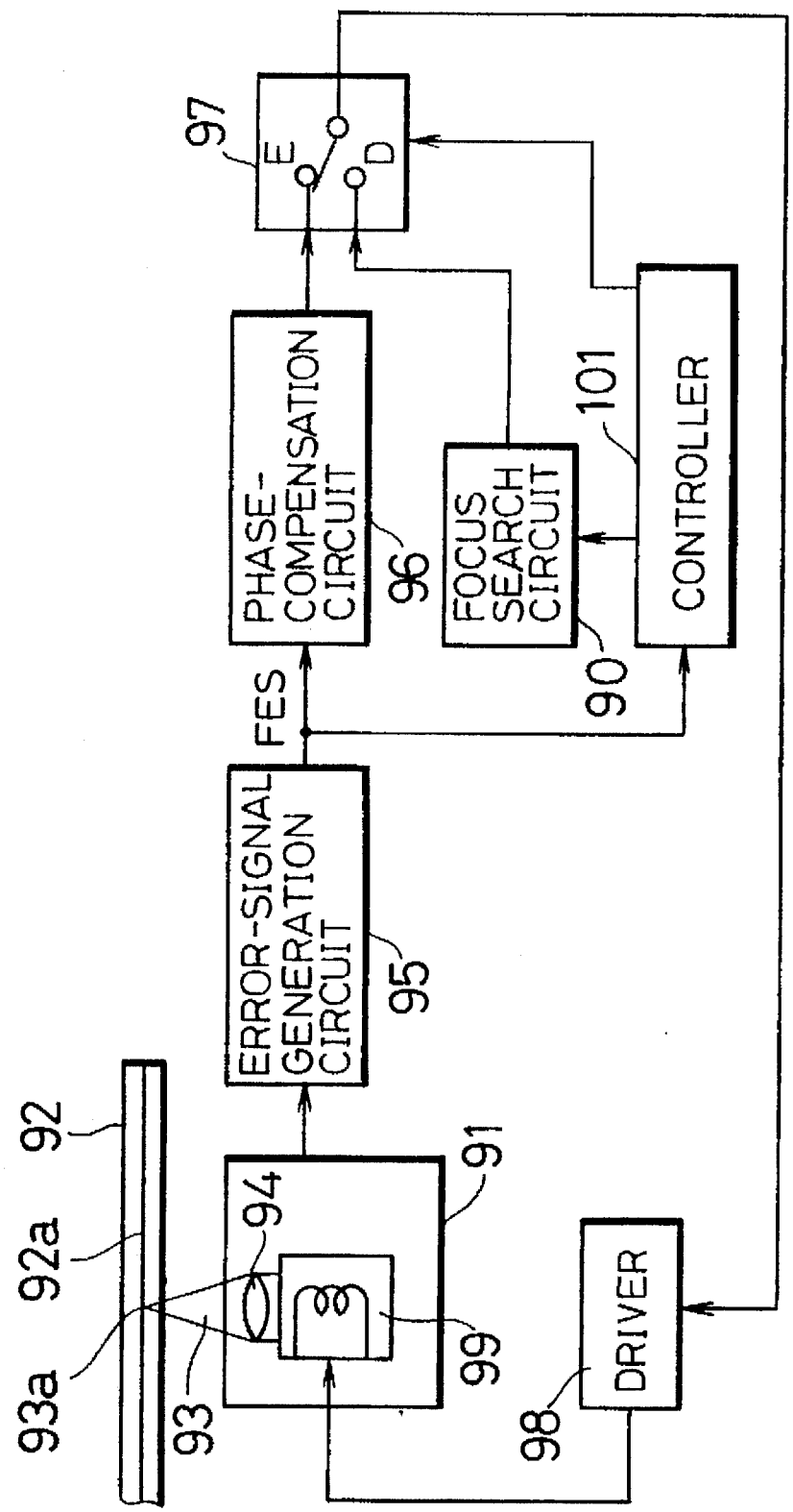
FIG. 39 is a block diagram showing a structural example of a prior art focusing control device.
Figure 41:
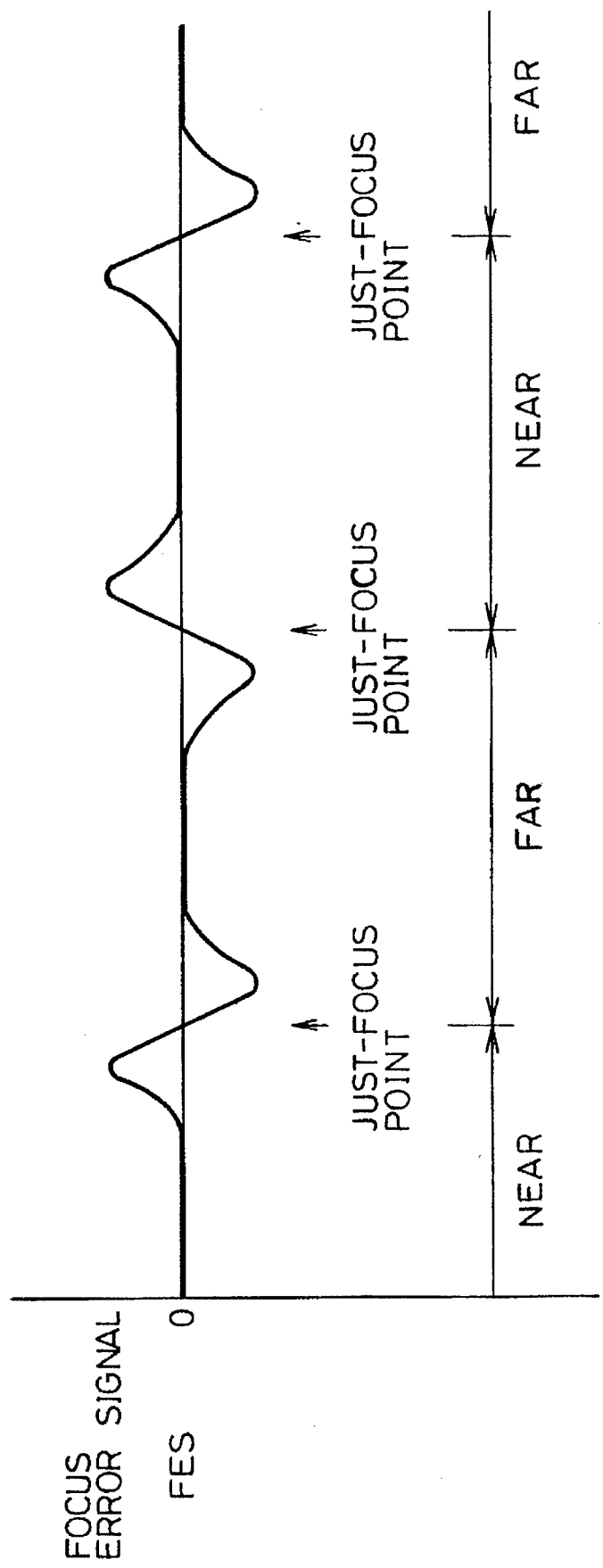
FIG. 41 is a graph of a wave form indicating the focus error signal that appears during a focus search operation in the focusing control device of FIG. 39.

Referring to FIGS. 37 and 38, the following description will discuss the ninth embodiment of the present invention. Here, for convenience of explanation, those members that have the same functions and that are described in the aforementioned embodiment are indicated by the same reference numerals and the description thereof is omitted.

As illustrated in FIG. 37, in the focusing control device of the present embodiment, its arrangement is different from that of the eighth embodiment in that the constructions of the storage circuit 30 and the selection circuit 51 are changed so that the signal INH, which is released by the controller 11, is supplied not to the storage circuit 30, but to the selection circuit 51.

In the eighth embodiment, after completion of the focus pull-in operation, the controller 11 releases the signal INH to the storage circuit 30 so that the outputs of the signals +SEL and -SEL are stopped so as not to add the offset signal VOFF to the focus error signal FES. In contrast, in the present embodiment, upon receipt of the signal INH, the selection circuit 51 selects neither +Voff nor -Voff, or selects 0 V, independently of the inputs of the signals +SEL and -SEL.

First, the storage circuit 30 is constituted by an RS flipflop 32 consisting of three-input NOR gates 303 and 304, shown in FIG. 11. Therefore, this storage circuit 30 makes it possible to determine the polarities of the signals +SEL and -SEL immediately after the start of a focus search operation in response to the input of the signal SET or RESET having the logic "H" level.

Figure 32:
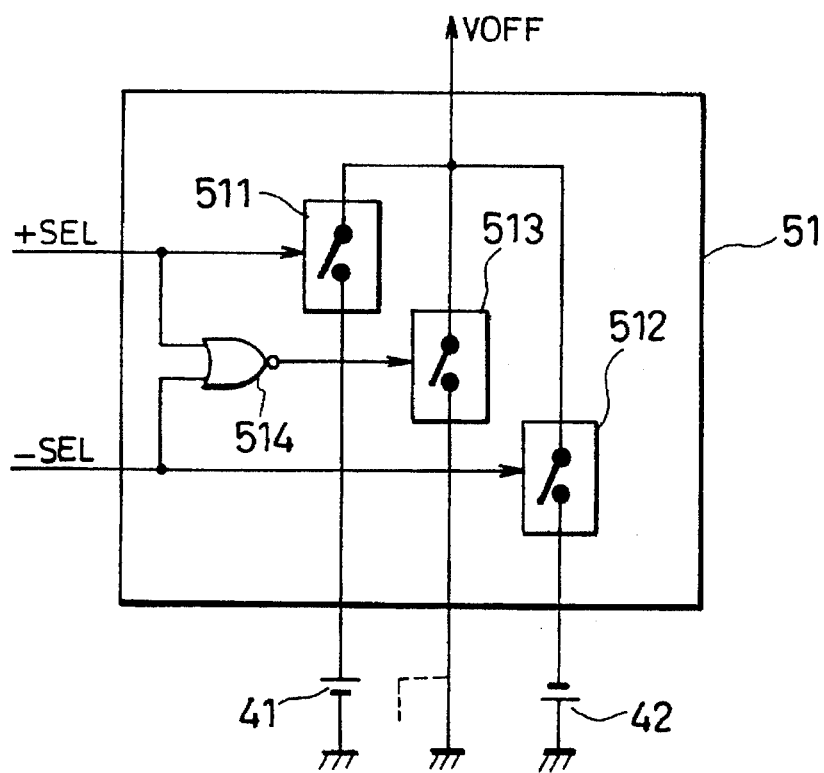
FIG. 32 is a circuit diagram showing a selection circuit in the focusing control device of FIG. 30.
Figure 33:
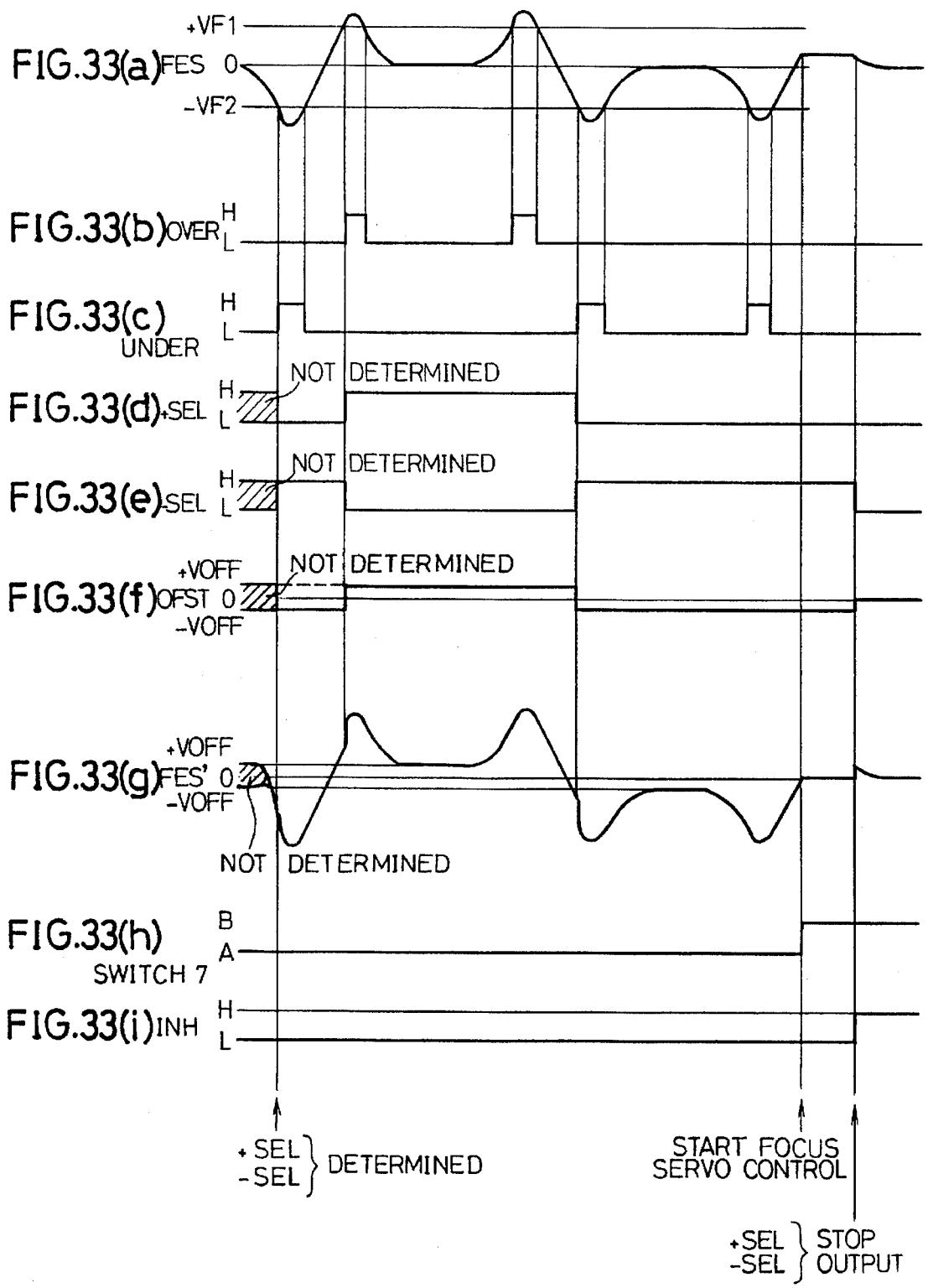
FIGS. 33(a) through 33(i) are graphs of wave forms that show a sequence of operations whereby the focusing control device of FIG. 30 shapes the wave form of the focus error signal.

Next, as illustrated in FIG. 38, the selection circuit 51 of the present invention has a construction wherein a switch 515 is added to the selection circuit 51 of the seventh embodiment (see FIG. 32). When the signal INH released from the controller 11 has the logic "L" level, the switch 515 is switched to the terminal F side, thereby allowing the selection circuit 51 to release the offset signal VOFF that has been selected by the switch 511, 512, or 513. Upon receipt of the INH signal of the logic "H" level from the controller 11, the switch 515 is switched to the terminal G side, thereby allowing the selection circuit 51 to release the offset signal VOFF of 0 V.

Since the objective of the signal INH is to stop or inhibit the offset signal VOFF from being added to the focus error signal FES in the following addition amplifier 60, the terminal F of the switch 515 may be connected to 0 V, or to grounds, or may be opened without being connected to anywhere, as indicated by a broken line in FIG. 38.

In the above-mentioned seventh through ninth embodiment, the explanation has been given based on the assumption that the polarity of the focus error signal FES varies between plus and minus sides with the grounded potential (0 V) set as the reference voltage Vref; yet, the present invention is not intended to be limited to this arrangement. For example, in the case of using a single voltage source of +5 V, the reference voltage Vref for the focus error signal FES may be set to a voltage (ffor example, +2.5 V) between 0 V and +5 V. In this case, since the focus error signal FES varies within the range from 0 V to +5 V with the reference voltage Vref located at the center, the first reference voltage +VF1 is set to a plus voltage greater than the reference voltage Vref and the second reference voltage −VF2 is set to a plus voltage smaller than the reference voltage Vref.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A focusing control device, which is used in an optical disk apparatus for controlling the position of the lens for converging a light beam so as to allow the light beam to be focused on an optical disk, comprising:

error-signal generation means for generating a focus error signal (FES);

detection means for detecting the quantity of light derived from a light beam reflected from an optical disk or transmitted through the optical disk;

offset-signal-generating means for generating an offset signal, for moving a lens toward a just-focus position which allows the light beam to be focused onto the optical disk, only when the quantity of light is smaller than a predetermined value, indicating an out-of-focus state, said offset-signal-generating means including discrimination means for discriminating in which direction the lens is displaced, from the just-focus position, with respect to the optical disk in accordance with the focus error signal, said offset-signal-generating means switching a polarity of the offset signal, based on a result of discrimination by said discrimination means;

addition means for adding the offset signal to the focus error signal; and control means for controlling the position of the lens in response to the output of the addition means.

2. The focus control device used for an optical disk apparatus as defined in claim 1, wherein said offset-signal-generating means includes light-reference-value generation means for setting the predetermined value, based on the maximum value of the quantity of light.

3. The focusing control device used for an optical disk apparatus as defined in claim 2, wherein the light-reference-value generation means includes peak hold means for holding the maximum value of the quantity of light released by the detection means and multiplication means for multiplying the maximum value by a constant.

4. The focusing control device used for an optical disk apparatus as defined in claim 1, wherein the discrimination means includes error-direction detection means for comparing the focus error signal with a first reference voltage so as to release a first result of discrimination indicating that the focus error signal is greater than the first reference voltage, as well as for comparing the focus error signal with a second reference voltage so as to release a second result of discrimination indicating that the focus error signal is smaller than the second reference voltage.

5. The focusing control device used for an optical disk apparatus as defined in claim 4, wherein the offset-signal-generating means further comprising:

a voltage-generating source for generating a voltage corresponding to the difference between the quantity of light and the predetermined value only when the quantity of light is smaller than the predetermined value; and polarity-switching means for forming an offset signal without inverting the polarity of the voltage released by the voltage-generating source upon receiving one of the outputs of the first result and second result of discrimination, and by inverting the polarity of the voltage upon receiving the other of the first result and second result of discrimination.

6. The focusing control device used for an optical disk apparatus as defined in claim 4, wherein the error-direction detection means includes:

a storage circuit for releasing a first discrimination signal for maintaining High as the first result of discrimination; for releasing a second discrimination signal for maintaining High as the second result of discrimination; and for making the respective first and second discrimination signals reset each other in response to their own rise from Low to High.

7. A focusing control device, which is used in an optical disk apparatus for controlling the position of the lens for converging a light beam so as to allow the light beam to be focused on an optical disk, comprising:

error-signal generation means for generating a focus error signal (FES);

detection means for detecting the quantity of light derived from a light beam reflected from an optical disk or transmitted through the optical disk;

offset-signal-generating means for generating an offset signal, for moving a lens toward a just-focus position which allows the light beam to be focused onto the optical disk, only when the quantity of light is smaller than a predetermined value, indicating an out-of-focus state, said offset-signal generating means including discrimination means for discriminating in which direction the lens is displaced, from the just-focus position, with respect to the optical disk, in accordance with the focus error signal;

addition means for adding the offset signal to the focus error signal; and control means for controlling the position of the lens in response to the output of the addition means, wherein the discrimination means includes error-direction detection means for releasing a first result of discrimination indicating that the amplitude of the focus error signal has varied from a smaller value to a greater value than a reference voltage, or a second result of discrimination indicating that the amplitude of the focus error signal has varied from a greater value to a smaller value than the reference voltage.

8. The focusing control device used for an optical disk apparatus as defined in claim 7, wherein the offset-signal-generating further comprising:

a voltage-generating source for generating a voltage corresponding to the difference between the quantity of light and the predetermined value only when the quantity of light is smaller than the predetermined value; and polarity-switching means for forming an offset signal without inverting the polarity of the voltage released by the voltage-generating source upon receiving one of the outputs of the first result and second result of discrimination, and by inverting the polarity of the voltage upon receiving the other of the first result and second result of discrimination.

9. The focusing control device used for an optical disk apparatus as defined in claim 7, wherein the error-direction detection means includes:

a storage circuit for releasing a first discrimination signal for maintaining High as the first result of discrimination; for releasing a second discrimination signal for maintaining High as the second result of discrimination; and for making the respective first and second discrimination signals reset each other in response to their own rise from Low to High.

10. A focusing control device which is used in an optical disk apparatus for controlling the position of the lens for converging a light beam so as to allow the light beam to be focused on an optical disk, comprising:

error-signal generation means for generating a focus error signal (FES);

detection means for detecting the quantity of light derived from a light beam reflected from an optical disk or transmitted through the optical disk;

offset-signal-generating means for generating an offset signal, for moving a lens toward a just-focus position which allows the light beam to be focused onto the optical disk, only when the quantity of light is smaller than a predetermined value, indicating an out-of-focus state addition means for adding the offset signal to the focus error signal; and control means for controlling the position of the lens in response to the output of the addition means, and wherein the offset-signal-generating means further comprises discriminating means for discriminating, in accordance with the focus error signal, whether the lens is located at an out-focus position that is closer to the optical disk in relation to the just-focus position or the lens is located at an out-focus position that is farther form the optical disk in relation to the just-focus position; light-difference signal generation means for generating a light-difference signal that has an amplitude corresponding to the difference between the predetermined value and the quantity of light only when the quantity of light is smaller than the predetermined value; and polarity-inverting means for generating an offset signal whose polarity is reversed to the polarity of the light-difference signal in accordance with the out-focus position; and wherein said control means moves the lens to the initial out-focus position prior to a focus pull-in operation and releases a polarity-decision signal to the polarity inverting means, so as to allow the offset signal to be released from the polarity-inverting means with a polarity corresponding to the initial out-focus position.

11. The focusing control device used for an optical disk apparatus as defined in claim 10, wherein the discrimination means includes error-direction detection means for comparing the focus error signal with a first reference voltage so as to release a first result of discrimination indicating that the focus error signal is greater than the first reference voltage, as well as for comparing the focus error signal with a second reference voltage so as to release a second result of discrimination indicating that the focus error signal is smaller than the second reference voltage.

12. The focusing control device used for an optical disk apparatus as defined in claim 10, wherein the discrimination means includes error-direction detection means for releasing a first result of discrimination indicating that the amplitude of the focus error signal has varied from a smaller value to a greater value than a reference voltage, or a second result of discrimination indicating that the amplitude of the focus error signal has varied from a greater value to a smaller value than the reference voltage.

13. The focusing control device used for an optical disk apparatus as defined in claim 10, wherein the discrimination means further includes comparison means for comparing the quantity of light detected by the detection means with a reference value, and releases the result of discrimination concerning the out-focus position only when the quantity of light exceeds the reference value.

14. The focusing control device used for an optical disk apparatus as defined in claim 11, wherein the discrimination means further includes comparison means for comparing the quantity of light detected by the detection means with a reference value and gate means for stopping the output of the error-direction detection means when the quantity of light is lower than the reference value.

15. The focusing control device used for an optical disk apparatus as defined in claim 12, wherein the discrimination means further includes comparison means for comparing the quantity of light detected by the detection means with a reference value and gate means for stopping the output of the error-direction detection means when the quantity of light is lower than the reference value.

16. The focusing control device used for an optical disk apparatus as defined in claim 10, further comprising:

light-reference-value generation means for setting the predetermined value based on the maximum value of the quantity of light.

17. The focusing control device used for an optical disk apparatus as defined in claim 16, wherein the light-reference-value generation means includes peak hold means for holding the maximum value of the quantity of light released by the detection means and multiplication means for multiplying the maximum value by a constant.

18. The focusing control device for an optical disk apparatus defined in claim 1, wherein:

said error signal generation means includes a pickup for recording and reproducing information by projecting the light beam onto the optical disk; and focus-error detection means for detecting a focus error between an information detecting point of the pickup and the recording face of the optical pickup;

said offset-signal-generating means includes light-reference value generation means setting the predetermined value from the output of the detection means;

light-difference detection means for releasing the difference between the output of the detection means and the predetermined value when the output of the detection means is not more than the predetermined value;

error-detection means for detecting a direction of an error that occurs between the information detecting point of the pickup and the recording face of the optical disk; and polarity-switching means for releasing the output of the focus-error detection means after switching the polarity thereof in response to the output of the error-direction-detection means, wherein said addition means adds the output of the polarity switching means to the output of the focus-error-detection means; and a servo means adjusts the information detecting point of the pickup in accordance with the output of the addition means.

19. The focusing control device used for an optical disk apparatus as defined in claim 18, wherein the error-direction detection means includes:

first comparison means for comparing the output of the focus-error detection means with a first reference value;

second comparison means for comparing the output of the focus-error detection means with a second reference value; and storage means that is set in response to either one of the outputs of the first and second comparison means, and reset in response to the other output.

20. The focusing control device used for an optical disk apparatus as defined in claim 18, wherein the error-direction detection means includes:

crossing detection means for detecting the point of time when the output of the focus-error detection means has crossed a predetermined error-signal reference voltage, as well as for detecting which direction the output of the focus-error detection means has crossed the error-signal reference voltage from, from plus side or minus side; and storage means that is set or reset depending on the output of the crossing detection means.

21. The focusing control device used for an optical disk apparatus as defined in claim 18, wherein the error-direction detection means includes:

comparison means for comparing the output of the light detection means with a reference value;

crossing detection means for detecting the point of time when the output of the focus-error detection means has crossed a predetermined error-signal reference voltage, as well as for detecting which direction the output of the focus-error detection means has crossed the error-signal reference voltage from, from plus side or minus side; and storage means that is set or reset depending on the outputs of the crossing detection means and the comparison means.

22. The focusing control device used for an optical disk apparatus as defined in claim 20, wherein the error-signal reference voltage is set to zero volt.

23. The focusing control device used for an optical disk apparatus as defined in claim 20, comprising:

a power supply for supplying a predetermined voltage to the optical disk apparatus, wherein the error-signal reference voltage is set to a voltage between the predetermined voltage and zero volts.

24. The focusing control device used for an optical disk apparatus as defined in claim 21, wherein the error-signal reference voltage is set to zero volt.

25. The focusing control device used for an optical disk apparatus as defined in claim 21, comprising:

a power supply for supplying a predetermined voltage to the optical disk apparatus, wherein the error-signal reference voltage is set to a voltage between the predetermined voltage and zero volts.

26. The focusing control device used for an optical disk apparatus as defined in claim 21, wherein the reference value is set to be equal to the predetermined value.

27. A focusing control device, which is used in an optical disk apparatus for controlling the position of a lens for converging a light beam so as to allow the light beam to be focused on an optical disk, comprising:

error-signal generation means for generating a focus error signal;

discrimination means for releasing a first result of discrimination indicating that the lens is closer to the optical disk in relation to the just-focus position, or a second result of discrimination indicating that the lens is farther from the optical disk in relation to the just-focus position;

voltage-generating means for generating an offset signal whose polarity becomes positive upon receiving one of the outputs of the first result and second result of discrimination, and becomes negative upon receiving the other output;

addition means for adding the offset signal to the focus error signal; and control means for releasing to the voltage-generating means an inhibit signal for inhibiting the offset signal from being generated in a proximity area including the just-focus position, as well as for controlling the position of the lens in response to the output of the addition means.

* * * * *